United States Patent [19]
Inoue et al.

[11] Patent Number: 6,110,860
[45] Date of Patent: Aug. 29, 2000

[54] CATALYST FOR PURIFYING EXHAUST GAS, PROCESS FOR PRODUCTION THEREOF, EXHAUST GAS PURIFYING FILTER, AND EXHAUST GAS PURIFYING APPARATUS

[75] Inventors: Masahiro Inoue, Fukuoka; Tatsuro Miyazaki, Fukuoka-ken; Nobuyuki Tokubuchi, Saga; Masaaki Arita, Onojo, all of Japan

[73] Assignee: Matsushita Electric Industrial Co., Ltd., Osaka, Japan

[21] Appl. No.: 08/919,275

[22] Filed: Aug. 28, 1997

[30] Foreign Application Priority Data

Sep. 12, 1996 [JP] Japan ..................................... 8-241749
Jun. 19, 1997 [JP] Japan ..................................... 9-162231

[51] Int. Cl.[7] .......................... B01J 27/055; B01J 27/047
[52] U.S. Cl. .......................... 502/218; 502/217; 502/219; 502/220; 502/221; 502/222; 502/223; 502/305
[58] Field of Search ..................................... 502/217, 218, 502/219, 220, 221, 222, 223, 305, 345, 353

[56] References Cited

U.S. PATENT DOCUMENTS

| | | | |
|---|---|---|---|
| 3,899,444 | 8/1975 | Stephens et al. ........................ | 252/455 |
| 4,466,947 | 8/1984 | Imanari et al. .......................... | 423/239 |
| 4,766,104 | 8/1988 | Fennemann .............................. | 502/218 |
| 4,966,873 | 10/1990 | Iida et al. .................................... | 502/84 |
| 5,215,953 | 6/1993 | Blumrich et al. ........................ | 502/218 |
| 5,227,356 | 7/1993 | Hess et al. ................................ | 502/217 |
| 5,686,373 | 11/1997 | Tenten et al. ............................ | 502/312 |

FOREIGN PATENT DOCUMENTS

| | | |
|---|---|---|
| 0450680 | 10/1991 | European Pat. Off. . |
| 3531871 | 3/1986 | Germany . |
| 4116364 | 11/1992 | Germany . |
| 58-143840 | 8/1983 | Japan . |
| 58-174236 | 10/1983 | Japan . |
| 62-298452 | 12/1987 | Japan . |

OTHER PUBLICATIONS

German Search Report dated Nov. 18, 1998 in German and in English.
Patent Abstracts of Japan, C–502, Jun. 8, 1988, vol. 12/No. 198 relating to JP 62–298452 (A).

*Primary Examiner*—Richard Booth
*Assistant Examiner*—Alexander G. Ghyka
*Attorney, Agent, or Firm*—Stevens, Davis, Miller & Mosher, L.L.P.

[57] ABSTRACT

A catalyst for exhaust gas purification characterized by high catalytic activity, heat resistance, and toxin resistance includes a metal oxide and at least one alkali metal sulfate or at least one alkaline earth metal sulfate. The process for producing the catalyst includes mixing the metal oxide with an aqueous solution of the sulfate, evaporating the mixture to dryness, and heat-treating the resultant mixed powder. An exhaust gas purifying apparatus includes an exhaust gas purifying filter having a high exhaust gas purification rate and an excellent durability. The filter includes a ceramic filter with a heat-resistant coating layer thereon for support of the catalyst.

27 Claims, 11 Drawing Sheets

CATALYST FOR PURIFYING EXHAUST GAS, PROCESS FOR PRODUCTION THEREOF, EXHAUST GAS PURIFYING FILTER, AND EXHAUST GAS PURIFYING APPARATUS

BACKGROUND OF THE INVENTION

The present invention relates to a catalyst for exhaust gas purification used for purifying exhaust gas from a diesel engine by burning particulates (solid carbon fine particles and liquid or solid high-molecular weight hydrocarbon fine particles) contained in the exhaust gas; a process for producing the catalyst for exhaust gas purification; an exhaust gas purifying filter supporting the catalyst for exhaust gas purification; and a exhaust gas purifying apparatus equipped with the exhaust gas purifying filter.

The particulates contained in exhaust gas from a diesel engine have a particle size of about 1 $\mu$m or less, tend to float in the air and are liable to be introduced into a human body by respiration. Moreover, the particulates also contain carcinogens. Therefore, the discharge of the particulates from a diesel engine is under increasingly strict regulations.

For removing the particulates from the exhaust gas, there is a method of collecting the particulates by the use of an exhaust gas purifying filter composed of a heat-resistant ceramic filter, heating the exhaust gas purifying filter by a heating means such as a burner or heater to burn the particulates, thereby converting the particulates to carbon dioxide, and then discharging the carbon dioxide. As the exhaust gas purifying filter, there is used a product obtained by supporting a catalyst for exhaust gas purification consisting of a metal oxide and the like on the aforesaid ceramic filter. In this case, the collected particulates can be burned at a lower temperature by virtue of the catalytic action of the catalyst for exhaust gas purification.

If the particulates can be burned at the exhaust gas temperature by using the exhaust gas purifying filter supporting such a catalyst for exhaust gas purification, a heating means need not be provided in an exhaust gas purifying apparatus, so that the structure of the exhaust gas purifying apparatus can be simplified.

However, it is difficult at present to burn the particulates sufficiently at the exhaust gas temperature even by the use of the exhaust gas purifying filter supporting the catalyst for exhaust gas purification, and simultaneous use of the exhaust gas purifying filter and a heating means is absolutely necessary. Accordingly, there is desired the development of a catalyst for exhaust gas purification having such a high catalytic activity that the particulates can be burned at a lower temperature.

It has been known that catalysts obtained by using metal oxides of, for example, Cu and/or V have a relatively high activity as catalysts for exhaust gas purification. For example, Japanese Patent Unexamined Publication No. 58-143840 (JPA-58-143840, hereinafter abbreviated as '840 Publication) discloses a catalyst for exhaust gas purification comprising a complex metal oxide containing Cu and V. Japanese Patent Unexamined Publication No. 58-174236 (JPA 58-174236, hereinafter abbreviated as '236 Publication) discloses a catalyst for exhaust gas purification obtained by adding an alkali metal to a metal oxide of, for example, Cu, V and/or Mo.

The above-mentioned conventional catalysts for exhaust gas purification, the exhaust gas purifying filters supporting this catalyst and the exhaust gas purifying apparatus using this filter, however, involve the following problems.

1) The catalyst for exhaust gas purification disclosed in '840 Publication and an exhaust gas purifying filter supporting this catalyst do not permit burning of particulates collected by the exhaust gas purifying filter at the exhaust gas temperature because the catalytic activity of the catalyst for exhaust gas purification is not sufficiently high to permit sufficient burning of the particulates at a low temperature.

2) The catalyst for exhaust gas purification disclosed in '236 Publication cannot have a high catalytic activity because in a calcination step in the production of the catalyst for exhaust gas purification, an alkali metal salt is decomposed into a highly reactive alkali metal oxide which is scattered by heat or reacts with other metal oxides present together therewith to form a complex metal oxide having a low activity (e.g. $LiVO_2$).

3) An exhaust gas purifying filter using the catalyst for exhaust gas purification disclosed in '236 Publication is disadvantageous in that it is subject to heat deterioration and hardly retain a high catalytic activity because the catalyst for exhaust gas purification has no high resistance to the heat of exhaust gas or the heat of combustion of particulates. Moreover, the filter is poor in toxin resistance against sulfur oxides in exhaust gas.

4) In conventional exhaust gas purifying apparatus, since exhaust gas from a diesel engine cannot be sent to an exhaust gas purifying filter while being maintained at a high temperature, the exhaust gas temperature is lowered, so that the combustion temperature of particulates cannot be high enough.

The present invention solve the above conventional problems and is intended to provide a catalyst for exhaust gas purification having a high catalytic activity for the combustion of particulates and having excellent heat resistance and toxin resistance against sulfur oxides; a process for producing a catalyst for exhaust gas purification which permits easy and sufficiently high-volume production of a catalyst for exhaust gas purification having a high catalytic activity for the combustion of particulates and having excellent heat resistance and toxin resistance against sulfur oxides; an exhaust gas purifying filter having a high exhaust gas purification rate and an excellent durability; and an exhaust gas purifying apparatus having a simple structure and excellent exhaust gas purifying properties.

5) The catalyst component(s) supported on the exhaust gas purifying filter is diffused into the filter, so that the activity of the catalyst is deteriorated.

The present invention solve this conventional problem and is intended to provide an exhaust gas purifying filter having an intermediate layer for suppressing the diffusion of catalyst component(s) into the filter.

6) The catalyst supported on the exhaust gas purifying filter has an insufficient number of contact points with the components of exhaust gas to be removed, so that these components cannot be sufficiently burned and removed.

The present invention solve this conventional problem and is intended to increase the contact points of a catalyst with the components of exhaust gas to be removed, by previously treating a filter with an acid or providing a filter with a granular, heat-resistant and inorganic material, and thereby increasing the combustion rate of these components.

7) Neither conventional oxides of Cu, V or Mo, nor complex metal oxides containing Cu, V and/or Mo can have a sufficient activity.

The present invention solve this conventional problem and is intended to improve catalytic activity for the combustion of particulates in exhaust gas by controlling valences in a metal oxide obtained by replacing a part of Cu, V and/or Mo of a metal oxide comprising Cu, V and/or Mo by an alkali metal, an alkaline earth metal or a transition metal.

8) The present invention improves the activity of a conventional catalyst comprising a metal oxide and one or more sulfates and is intended to increase the contact points of a catalyst with particulates in exhaust gas by lowering the melting point by adding cesium sulfate and potassium sulfate, and thereby improve the catalytic activity for the combustion of particulates in exhaust gas.

SUMMARY OF THE INVENTION

For solving the above problems, the catalyst for exhaust gas purification of the present invention comprises a metal oxide, at least one alkali metal sulfate selected from the group consisting of sulfates of Li, Na, K, Rb and Cs, and/or at least one alkaline earth metal sulfate selected from the group consisting of sulfates of Be, Mg, Ca, Sr and Ba. In the present specification, the metal oxide includes complex metal oxides. As a word referring to only a complex metal oxide, there is used the word "complex metal oxide" but not the word "metal oxide".

By virtue of such a composition, it becomes possible to provide a catalyst for exhaust gas purification having a high catalytic activity for the combustion of particulates and having excellent heat resistance and toxin resistance against sulfur oxides.

The process for producing a catalyst for exhaust gas purification of the present invention comprises a mixing step in which a metal oxide is mixed with an aqueous sulfate solution, preferably an aqueous solution comprising at least one alkali metal sulfate and/or at least one alkaline earth metal sulfate; and a heat-treatment step in which the mixed solution obtained by the mixing step is evaporated to dryness and the mixed powder thus obtained is heat-treated.

By virtue of such a constitution, it becomes possible to provide a process for producing a catalyst for exhaust gas purification which permits easy and sufficiently high-volume production of a catalyst for exhaust gas purification having a high catalytic activity for the combustion of particulates and having excellent heat resistance and toxin resistance against sulfur oxides.

The exhaust gas purifying filter of the present invention comprises a honeycomb or plate-like ceramic filter and the catalyst for exhaust gas purification of the present invention.

By virtue of such a structure, it becomes possible to provide an exhaust gas purifying filter having a high exhaust gas purification rate and an excellent durability.

The exhaust gas purifying apparatus of the present invention comprises the exhaust gas purifying filter of the present invention, a container accomodating the exhaust gas purifying filter, an exhaust gas inlet formed on one side of the container, and an exhaust gas outlet formed on the other side of the container.

By virtue of such a structure, it becomes possible to provide an exhaust gas purifying apparatus having a simple structure and excellent exhaust gas purifying properties.

In the exhaust gas purifying filter of the present invention, at least one member selected from the group consisting of silica, zirconia, titania and alumina which are not reactive with the components of the catalyst may be provided on the filter. When such a structure is employed, the diffusion of the components of the catalyst into the filter can be suppressed. The filter also may be previously treated with an acid or provided with granular silica. When such a structure is employed, the contact points of the catalyst with exhaust gas components to be removed can be increased.

DETAILED DESCRIPTION OF THE INVENTION

Figure 1:
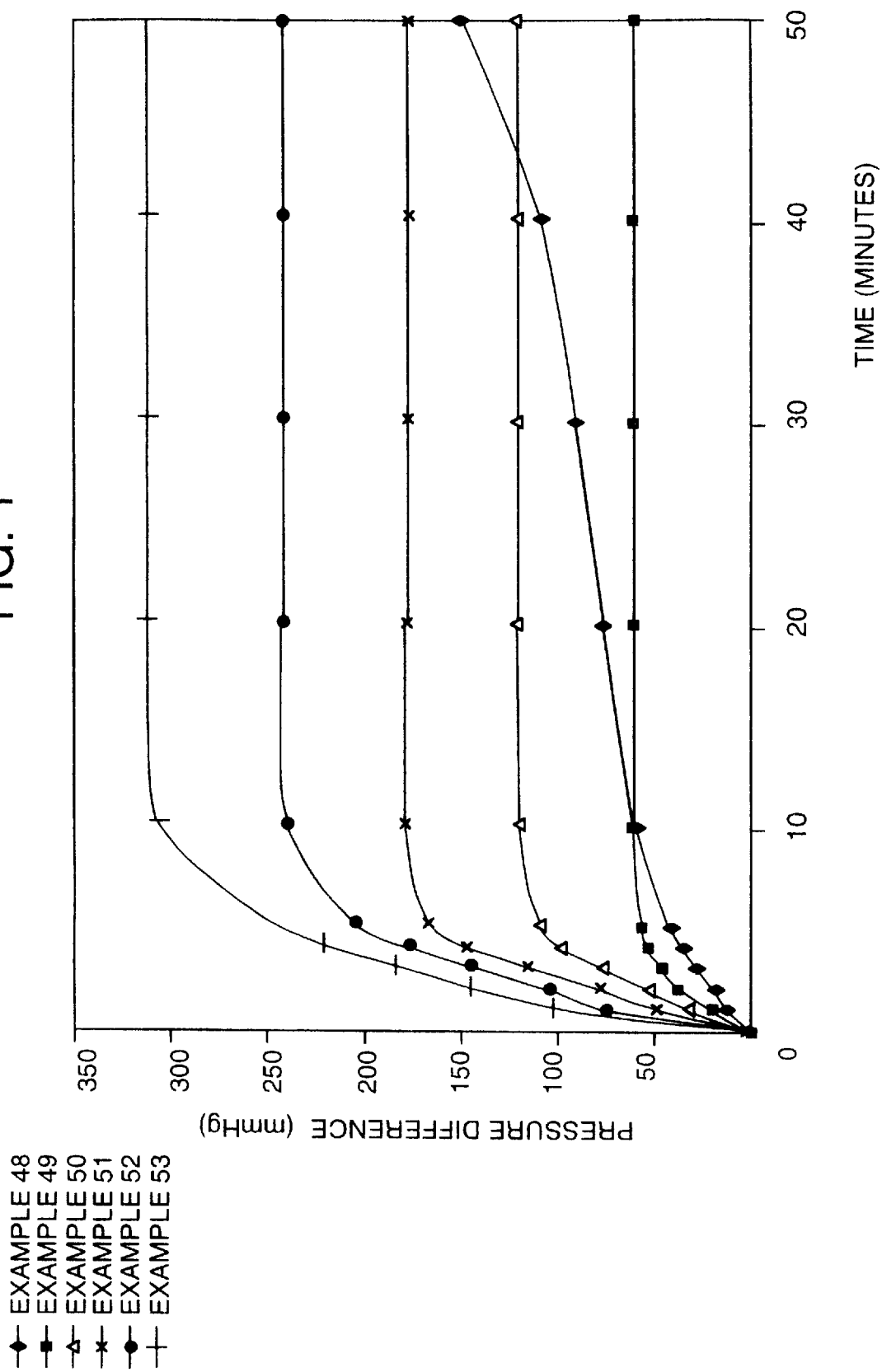
FIG. 1 is a graph showing the change with time of the difference between atmospheric pressure and exhaust gas pressure in each of the exhaust gas purifying filters of Examples 48 to 53.

Embodiment 1 of the present invention is a catalyst for exhaust gas purification comprising a metal oxide, at least one alkali metal sulfate selected from the group consisting of sulfates of Li, Na, K, Rb and Cs, and/or at least one alkaline earth metal sulfates selected from the group consisting of sulfates of Be, Mg, Ca, Sr and Ba. The catalytic activity of the metal oxide can be increased by mixing the metal oxide with the alkali metal sulfate(s) and/or the alkaline earth metal sulfate(s). Moreover, the high catalytic activity for the combustion of particulate can be maintained by using the sulfate(s) which has the highest thermal stability, i.e., the highest heat resistance among nitrates, acetates, carbonates, chlorides, etc. and is excellent in toxin resistance against sulfur oxides.

Embodiment 2 of the present invention is a catalyst for exhaust gas purification according to Embodiment 1, wherein the metal oxide contains at least one metal selected from the group consisting of V, Nb, Ta, Cr, Mo, W, Mn, Fe, Co, Ni, Cu, Zn, Ga, Sn and Pb. Of various metal oxides, such a metal oxide can give a catalyst for exhaust gas purification having a higher catalytic activity for the combustion of particulates.

Embodiment 3 of the present invention is a catalyst for exhaust gas purification according to Embodiment 1 or 2, wherein the sulfate is cesium sulfate. Of various sulfates, cesium sulfate can impart an especially high catalytic activity to the metal oxide.

Embodiment 4 of the present invention is a catalyst for exhaust gas purification according to any one of Embodiments 1 to 3, wherein the metal oxide is copper oxide. Of various metal oxides, copper oxide is inexpensive and can have a high catalytic activity.

Embodiment 5 of the present invention is a catalyst for exhaust gas purification according to any one of Embodiments 1 to 3, wherein the metal oxide is vanadium oxide or molybdenum oxide. Like copper oxide, vanadium oxide and molybdenum oxide have a higher catalytic activity than do other metal oxides.

Embodiment 6 of the present invention is a catalyst for exhaust gas purification according to any one of Embodiments 1 to 3, wherein the metal oxide is either a complex metal oxide of Cu and V or a complex metal oxide of Cu and Mo. In this case, a higher catalytic activity can be attained as compared with the case of mixing one of copper oxide, vanadium oxide and molybdenum oxide alone with the sulfate(s).

Embodiment 7 of the present invention is a catalyst for exhaust gas purification according to Embodiment 6, wherein the molar ratio of Cu to V or of Cu to Mo is 1:1 to 4:1. In this case, the catalytic activities of metal oxides of Cu and V respectively, or Cu and Mo respectively, can be mutually increased.

Embodiment 8 of the present invention is a catalyst for exhaust gas purification according to Embodiment 6 or 7, wherein the complex metal oxide comprises at least one member selected from the group consisting of $CuVO_3$, $Cu_3V_2O_8$ and $Cu_5V_2O_{10}$. Such a complex metal oxide can have an especially high catalytic activity, among complex metal oxides of Cu and V.

Embodiment 9 of the present invention is a catalyst for exhaust gas purification according to Embodiment 6 or 7, wherein the complex metal oxide comprises at least one member selected from the group consisting of $CuMoO_4$, $Cu_3Mo_2O_9$ and $Cu_2MoO_5$. Such a complex metal oxide can have an especially high catalytic activity, among complex metal oxides of Cu and Mo.

Embodiment 10 of the present invention is a catalyst for exhaust gas purification according to any one of Embodiments 1 to 9, wherein the molar ratio of the metal oxide to the sulfate(s) is 9:1 to 1:9, preferably 2:1 to 1:5, more preferably 1:1 to 1:2. As to the molar ratio of the metal oxide to the sulfate(s), with a decrease of the proportion of the sulfate(s), the improvement of the catalytic activity by the mixing with the sulfate(s) tends to become unremarkable. On the other hand, with an increase of the proportion of the sulfate(s), the exhibition of the catalytic action of the metal oxide tends to become insufficient. In the above range, the metal oxide can be further improved in catalytic activity by its mixing with the sulfate(s).

Embodiment 11 of the present invention is a catalyst for exhaust gas purification according to any one of Embodiments 1 to 10, which further comprises at least one noble metal selected from the group consisting of Pt, Pd and Rh. By virtue of the catalytic action of the noble metal(s), the catalytic activity for the combustion of particulates can be further increased.

Embodiment 12 of the present invention is a catalyst for exhaust gas purification according to Embodiment 11, wherein the molar ratio of the metal oxide to the noble metal(s) is 100:1 to 3:1, preferably 30:1 to 10:1. As to the molar ratio of the metal oxide to the noble metal(s), with a decrease of the proportion of the noble metal(s), the improvement of the catalytic activity by the incorporation with the noble metal(s) tends to become unremarkable. On the other hand, with an increase of the proportion of the noble metal(s), the exhibition of the catalytic action of the metal oxide tends to become insufficient. In the above range, the incorporation with the noble metal(s) further improves the catalytic activity.

Embodiment 13 of the present invention is a process for producing a catalyst for exhaust gas purification which comprises a mixing step in which a metal oxide is mixed with an aqueous sulfate solution, preferably an aqueous solution comprising at least one alkali metal sulfate and/or at least one alkaline earth metal sulfate; and a heat-treatment step in which the mixed solution obtained by the mixing step is evaporated to dryness and the mixed powder thus obtained is heat-treated. This process permits easy and sufficiently high-volume production of a catalyst for exhaust gas purification having a high catalytic activity for the combustion of particulates and having excellent heat resistance and toxin resistance against sulfur oxides.

Embodiment 14 of the present invention is an exhaust gas purifying filter comprising a honeycomb or plate-like ceramic filter and a catalyst for exhaust gas purification according to any one of Embodiments 1 to 12 supported on the ceramic filter. Since the exhaust gas purifying filter is equipped with the catalyst for exhaust gas purification having a high catalytic activity for the combustion of the particulates and having excellent heat resistance and toxin resistance against sulfur oxides, it can have an increased exhaust gas purification rate and an improved durability.

Embodiment 15 of the present invention is an exhaust gas purifying filter according to Embodiment 14, wherein the weight ratio of the catalyst for exhaust gas purification to the ceramic filter is 5 wt % to 50 wt %, preferably 10 wt % to 40 wt %.

With a decrease of the weight ratio of the catalyst for exhaust gas purification to the ceramic filter, the catalyst for exhaust gas purification tends to be unable to exhibit a sufficient catalytic action. With an increase of the weight ratio of the catalyst, the pressure loss tends to be increased immediately after the start of collection of particulates. In the above range, the increase of pressure loss in the exhaust gas purifying filter can be prevented while maintaining a high exhaust gas purification rate.

Embodiment 16 of the present invention is an exhaust gas purifying filter comprising a honeycomb or plate-like ceramic filter, a coating layer of at least one member selected from the group consisting of silica, zirconia, titania and silica-alumina which is formed on the ceramic filter, and a catalyst for exhaust gas purification supported on the coating layer. The previous formation of the intermediate layer on the filter suppresses the diffusion of the components of the catalyst into the filter and improves the durability of the catalyst.

Embodiment 17 of the present invention is an exhaust gas purifying filter according to Embodiment 16, wherein the thickness of the coating layer formed on the ceramic filter is 1 µm to 1,000 µm.

When the intermediate layer formed on the filter is too thin, the components of the catalyst diffuse into the filter through the intermediate layer. When the intermediate layer is too thick, the pressure loss tends to be increased immediately after the start of collection of particulates. In the above range, the coating layer suppresses the diffusion of the components of the catalyst and prevents the increase of pressure loss in the exhaust gas purifying filter.

Embodiment 18 of the present invention is an exhaust gas purifying filter comprising a honeycomb or plate-like ceramic filter treated with an acid, and a catalyst for exhaust gas purification provided on the ceramic filter. The previous acid treatment of the filter increases the surface area of the filter and hence the contact points of the supported catalyst with the components of exhaust gas to be increased.

Embodiment 19 of the present invention is an exhaust gas purifying filter according to Embodiment 16, which supports a catalyst for exhaust gas purification according to any one of Embodiments 1 to 12.

Embodiment 20 of the present invention is an exhaust gas purifying filter according to Embodiment 18, which supports a catalyst for exhaust gas purification according to any one of Embodiments 1 to 12.

Embodiment 21 of the present invention is an exhaust gas purifying filter comprising a honeycomb or plate-like ceramic filter, a heat-resistant inorganic material provided on the ceramic filter, and a catalyst for exhaust gas purification according to any one of Embodiments 1 to 12 supported on the heat-resistant inorganic material. The previous provision of the heat-resistant inorganic material, preferably a granular inorganic material, on the filter increases the surface area of the filter and hence the contact points of the supported catalyst with the components of exhaust gas to be increased.

Embodiment 22 of the present invention is an exhaust gas purifying apparatus comprising an exhaust gas purifying filter according to any one of Embodiments 14 to 21, a container accommodating the exhaust gas purifying filter, an exhaust gas inlet formed on one side of the container, and an exhaust gas outlet formed on the other side of the container. Thus, it becomes possible to provide an exhaust gas purifying apparatus having a simple structure and excellent exhaust gas purifying properties.

Embodiment 23 of the present invention is an exhaust gas purifying apparatus according to Embodiment 22, which further comprises a heating means provided in or near the container. When the temperature of exhaust gas is lower than the combustion temperature of particulates, the combustion of the particulates can be accelerated by heating the exhaust gas or the exhaust gas purifying filter by the heating means.

Embodiment 24 of the present invention is an exhaust gas purifying apparatus according to Embodiment 22 or 23, which further comprises a heat insulating means provided around a pipe connecting an engine to the exhaust gas inlet and/or the container. The heat insulating means prevents the temperature of exhaust gas from being lowered before the flow of the exhaust gas into the exhaust gas purifying filter, and hence permits combustion of particulates at the exhaust gas temperature.

Embodiment 25 of the present invention is an exhaust gas purifying apparatus according to any one of Embodiments 22 to 24, which is located near an engine manifold. In this case, the temperature of exhaust gas is prevented from being lowered before the flow of the exhaust gas into the exhaust gas purifying filter, so that the combustion of particulates at the exhaust gas temperature can be made possible.

Embodiment 26 of the present invention is a catalyst for exhaust gas purification according to any one of Embodiments 1 to 12, wherein a part of Cu contained in the catalyst for exhaust gas purification is replaced by at least one substituent metal selected from the group consisting of Li, Na, K, Rb, Cs, Be, Mg, Ca, Sr, Ba, Sc, Ti, Cr, Mn, Fe, Co, Ni, Zn, Ga, Ge, Zr, Nb, Mo, Ta and W. In this case, the catalytic activity for the combustion of particulates can be increased by controlling the valences in the metal oxide.

Embodiment 27 of the present invention is an exhaust gas purifying filter according to any one of Embodiments 14 to 21, wherein a part of Cu contained in the catalyst for exhaust gas purification is replaced by at least one substituent metal selected from the group consisting of Li, Na, K, Rb, Cs, Be, Mg, Ca, Sr, Ba, Sc, Ti, Cr, Mn, Fe, Co, Ni, Zn, Ga, Ge, Zr, Nb, Mo, Ta and W. In this case, the catalytic activity for the combustion of particulates can be increased by controlling the valences in the metal oxide.

Embodiment 28 of the present invention is an exhaust gas purifying apparatus according to any one of Embodiments 22 to 25, wherein a part of Cu contained in the catalyst for exhaust gas purification is replaced by at least one substituent metal selected from the group consisting of Li, Na, K, Rb, Cs, Be, Mg, Ca, Sr, Ba, Sc, Ti, Cr, Mn, Fe, Co, Ni, Zn, Ga, Ge, Zr, Nb, Mo, Ta and W. In this case, the catalytic activity for the combustion of particulates can be increased by controlling the valences in the metal oxide.

Embodiment 29 of the present invention is a catalyst for exhaust gas purification according to any one of Embodiments 1 to 8 and 9 to 12, wherein a part of V contained in the catalyst for exhaust gas purification is replaced by at least one substituent metal selected from the group consisting of Li, Na, K, Rb, Cs, Be, Mg, Ca, Sr, Ba, Sc, Ti, Cr, Mn, Fe, Co, Ni, Zn, Ga, Ge, Zr, Nb, Mo, Ta and W. In this case, the catalytic activity for the combustion of particulates can be increased by controlling the valences in the metal oxide.

Embodiment 30 of the present invention is an exhaust gas purifying filter according to any one of Embodiments 14 to 21, wherein a part of V contained in the catalyst for exhaust gas purification is replaced by at least one substituent metal selected from the group consisting of Li, Na, K, Rb, Cs, Be, Mg, Ca, Sr, Ba, Sc, Ti, Cr, Mn, Fe, Co, Ni, Zn, Ga, Ge, Zr, Nb, Mo, Ta and W. In this case, the catalytic activity for the combustion of particulates can be increased by controlling the valences in the metal oxide.

Embodiment 31 of the present invention is an exhaust gas purifying apparatus according to any one of Embodiments 22 to 25, wherein a part of V contained in the catalyst for exhaust gas purification is replaced by at least one substituent metal selected from the group consisting of Li, Na, K, Rb, Cs, Be, Mg, Ca, Sr, Ba, Sc, Ti, Cr, Mn, Fe, Co, Ni, Zn, Ga, Ge, Zr, Nb, Mo, Ta and W. In this case, the catalytic activity for the combustion of particulates can be increased by controlling the valences in the metal oxide.

Embodiment 32 of the present invention is a catalyst for exhaust gas purification according to any one of Embodiments 1 to 7 and 9 to 12, wherein a part of Mo contained in the catalyst for exhaust gas purification is replaced by at least one substituent metal selected from the group consisting of Li, Na, K, Rb, Cs, Be, Mg, Ca, Sr, Ba, Sc, Ti, V, Cr, Mn, Fe, Co, Ni, Cu, Zn, Ga, Ge, Zr, Nb, Ta and W. In this case, the catalytic activity for the combustion of particulates can be increased by controlling the valences in the metal oxide.

Embodiment 33 of the present invention is an exhaust gas purifying filter according to any one of Embodiments 14 to 21, wherein a part of Mo contained in the catalyst for exhaust gas purification is replaced by at least one substituent metal selected from the group consisting of Li, Na, K, Rb, Cs, Be, Mg, Ca, Sr, Ba, Sc, Ti, V, Cr, Mn, Fe, Co, Ni, Cu, Zn, Ga, Ge, Zr, Nb, Ta and W. In this case, the catalytic activity for the combustion of particulates can be increased by controlling the valences in the metal oxide.

Embodiment 34 of the present invention is an exhaust gas purifying apparatus according to any one of Embodiments 22 to 25, wherein a part of Mo contained in the catalyst for exhaust gas purification is replaced by at least one substituent metal selected from the group consisting of Li, Na, K, Rb, Cs, Be, Mg, Ca, Sr, Ba, Sc, Ti, V, Cr, Mn, Fe, Co, Ni, Cu, Zn, Ga, Ge, Zr, Nb, Ta and W. In this case, the catalytic activity for the combustion of particulates can be increased by controlling the valences in the metal oxide.

Embodiment 35 of the present invention is a catalyst for exhaust gas purification according to any one of Embodiments 26 to 28, wherein the percentage of the replacement of Cu by the substituent metal is 0.01% to 50%, preferably 0.1% to 30%.

When the percentage of the substituent metal is too low, no effect of the control of the valences is obtained. When the percentage is too high, the structure itself of the metal oxide is changed, resulting in a deteriorated activity. In the above range, the catalytic activity for the combustion of particulates can be increased by controlling the valences in the metal oxide.

Embodiment 36 of the present invention is a catalyst for exhaust gas purification according to any one of Embodiments 29 to 31, wherein the percentage of the replacement of V by the substituent metal is 0.01% to 50%, preferably 0.1% to 30%.

When the percentage of the substituent metal is too low, no effect of the control of the valences is obtained. When the percentage is too high, the structure itself of the metal oxide is changed, resulting in a deteriorated activity. In the above range, the catalytic activity for the combustion of particulates can be increased by controlling the valences in the metal oxide.

Embodiment 37 of the present invention is a catalyst for exhaust gas purification according to any one of Embodiments 32 to 34, wherein the percentage of the replacement of Mo by the substituent metal is 0.01% to 50%, preferably 0.1% to 30%.

When the percentage of the substituent metal is too low, no effect of the control of the valences is obtained. When the percentage is too high, the structure itself of the metal oxide is changed, resulting in a deteriorated activity. In the above range, the catalytic activity for the combustion of particulates can be increased by controlling the valences in the metal oxide.

Embodiment 38 of the present invention is a catalyst for exhaust gas purification according to any one of Embodiments 1 to 12, 26, 29, 32, and 35 to 37, wherein the sulfate(s) includes cesium sulfate, at least one alkali metal sulfate selected from the group consisting of sulfates of Li, Na, K and Rb, and/or at least one alkaline earth metal sulfate selected from the group consisting of sulfates of Be, Mg, Ca, Sr and Ba. By thus lowering the melting point of the sulfates, the contact points of the catalyst with particulates in exhaust gas are increased to improve the catalytic activity for the combustion of the particulates.

Embodiment 39 of the present invention is a catalyst for exhaust gas purification according to Embodiment 38, wherein the sulfate(s) includes cesium sulfate and potassium sulfate. By thus lowering the melting point of the sulfates, the contact points of the catalyst with particulates in exhaust gas are increased to improve the catalytic activity for the combustion of the particulates.

Embodiment 40 of the present invention is a catalyst for exhaust gas purification according to Embodiment 39, wherein among the sulfates, the mixing ratio of cesium sulfate to potassium sulfate is preferably 9:1 to 3:7 by mole, more preferably 8:2 to 4:6 by mole. In the above range, the melting point of the sulfates can be lowered, and the contact points of the catalyst with particulates in exhaust gas are increased to improve the catalytic activity for the combustion of the particulates.

The present invention is explained in further detail with the following examples.

EXAMPLE 1

Copper oxide powder was suspended in an aqueous cesium sulfate solution so that the molar ratio of cesium sulfate to copper oxide was set at 1:1 (Cs:Cu). The resulting suspension was evaporated to dryness and then heat-treated in an electric furnace at 900° C. for 5 hours to obtain a catalyst for exhaust gas purification of Example 1. This catalyst is hereinafter referred to as the catalyst of Example 1.

EXAMPLE 2

A catalyst for exhaust gas purification was produced by the same process as in Example 1 except for using lithium sulfate in place of cesium sulfate. This catalyst is hereinafter referred to as the catalyst of Example 2.

EXAMPLE 3

A catalyst for exhaust gas purification was produced by the same process as in Example 1 except for using sodium sulfate in place of cesium sulfate. This catalyst is hereinafter referred to as the catalyst of Example 3.

EXAMPLE 4

A catalyst for exhaust gas purification was produced by the same process as in Example 1 except for using potassium sulfate in place of cesium sulfate. This catalyst is hereinafter referred to as the catalyst of Example 4.

EXAMPLE 5

A catalyst for exhaust gas purification was produced by the same process as in Example 1 except for using rubidium sulfate in place of cesium sulfate. This catalyst is hereinafter referred to as the catalyst of Example 5.

EXAMPLE 6

A catalyst for exhaust gas purification was produced by the same process as in Example 1 except for using beryllium sulfate in place of cesium sulfate. This catalyst is hereinafter referred to as the catalyst of Example 6.

EXAMPLE 7

A catalyst for exhaust gas purification was produced by the same process as in Example 1 except for using magnesium sulfate in place of cesium sulfate. This catalyst is hereinafter referred to as the catalyst of Example 7.

EXAMPLE 8

A catalyst for exhaust gas purification was produced by the same process as in Example 1 except for using calcium sulfate in place of cesium sulfate. This catalyst is hereinafter referred to as the catalyst of Example 8.

EXAMPLE 9

A catalyst for exhaust gas purification was produced by the same process as in Example 1 except for using strontium sulfate in place of cesium sulfate. This catalyst is hereinafter referred to as the catalyst of Example 9.

EXAMPLE 10

A catalyst for exhaust gas purification was produced by the same process as in Example 1 except for using barium sulfate in place of cesium sulfate. This catalyst is hereinafter referred to as the catalyst of Example 10.

Comparative Example 1

A catalyst for exhaust gas purification composed of only copper oxide powder was produced by the same process as in Example 1. This catalyst is hereinafter referred to as the catalyst of Comparative Example 1.

Evaluation Example 1

The catalysts of Examples 1 to 10 and Comparative Example 1 were subjected to the following particulates combustion experiment.

Each catalyst and powder of particulates (a mixture of carbon mfd. by Nakarai Chemical Co., Ltd. and anthraquinone in a weight ratio of 2:1) were mixed in a weight ratio of 1:1. The resulting mixture was packed into a quartz glass reaction tube with an inside diameter of 12 mm, after which the temperature inside the reaction tube was raised at a constant rate with a tubular electric furnace provided on the periphery of the reaction tube, while introducing a test gas composed of nitrogen gas containing 5 vol % of $O_2$ and 50 ppm of $SO_2$ into the reaction tube at a flow rate of 500 cc/min. The concentrations of CO and $CO_2$ were detected with a gas sensor located on the exhaust gas side of the reaction tube, and the amount of the CO and $CO_2$ were determined. Based on the amount of CO and $CO_2$ above and the known amount of C contained in the particulates in the reaction tube, a combustion rate was calculated. A temperature at which 10% of the particulates were combusted was hereinafter abbreviated as 10% combustion temperature. Table 1 shows the 10% combustion temperatures of each catalyst.

As is clear from Table 1, all of the catalysts of Examples 1 to 10, i.e., the catalysts of the present invention composed of a metal oxide and a sulfate have lower 10% combustion temperatures,.namely, higher catalytic activities for the combustion of the particulates compared with the catalyst of Comparative Example 1 composed of only copper oxide.

It was found that the catalysts obtained by the use of cesium sulfate (Example 1), rubidium sulfate (Example 5), beryllium sulfate (Example 6) or magnesium sulfate (Example 7) have an especially excellent catalytic activity.

EXAMPLE 11

A catalyst for exhaust gas purification of Example 11 was obtained by mixing powder of the catalyst of Example 1 with an aqueous platinum chloride solution and evaporating the resulting mixture to dryness followed by heat-treatment in an electric furnace at 900° C. for 5 hours. This catalyst is hereinafter referred to as the catalyst of Example 11.

Evaluation Example 2

The catalyst of Example 11 was subjected to a combustion experiment by the same method as in Evaluation Example 1.

Table 2 shows the 10% combustion temperature of the catalyst of Example 11 together with the result obtained for the catalyst of Example 1.

As is clear from Table 2, the catalyst of Example 11 containing Pt has a lower 10% combustion temperature, namely, a higher catalytic activity for the combustion of the particulates compared with the catalyst of Example 1.

Comparative Example 2

A catalyst for exhaust gas purification was produced by the same process as in Example 1 except for using cesium acetate in place of cesium sulfate. This catalyst is hereinafter referred to as the catalyst of Comparative Example 2.

Comparative Example 3

A catalyst for exhaust gas purification was produced by the same process as in Example 1 except for using cesium nitrate in place of cesium sulfate. This catalyst is hereinafter referred to as the catalyst of Comparative Example 3.

Comparative Example 4

A catalyst for exhaust gas purification was produced by the same process as in Example 1 except for using cesium carbonate in place of cesium sulfate. This catalyst is hereinafter referred to as the catalyst of Comparative Example 4.

Evaluation Example 3

The catalysts of Comparative Examples 2 to 4 were subjected to a combustion experiment by the same method as in Evaluation Example 1.

Table 3 shows the 10% combustion temperatures of the catalysts of Comparative Examples 2 to 4 together with the result obtained for the catalyst for exhaust gas purification of Example 1.

It was found that as shown in Table 3, all of the 10% combustion temperatures of the catalysts of Comparative Examples 2 to 4 are higher than that of the catalyst of Example 1, namely, the catalyst of Example 1 has a higher catalytic activity. As is clear from this result, the catalyst obtained by using cesium sulfate as a starting material as in the present invention is superior in catalytic activity to the catalysts obtained by using cesium acetate, cesium nitrate or cesium carbonate as a starting material. Moreover, cesium sulfate is superior also in thermal stability to nitrate, acetate, carbonate, chloride, etc. of cesium and hence is considered the most preferable salt for preventing cesium salt from being scattered by fusion or decomposition due to a high temperature during the combustion of particulates, or from reacting with the metal oxide and lowering the catalytic activity.

EXAMPLE 12

A catalyst for exhaust gas purification was produced by the same process as in Example 1 except for using vanadium oxide in place of copper oxide. This catalyst is hereinafter referred to as the catalyst of Example 12.

EXAMPLE 13

A catalyst for exhaust gas purification was produced by the same process as in Example 1 except for using niobium oxide in place of copper oxide. This catalyst is hereinafter referred to as the catalyst of Example 13.

EXAMPLE 14

A catalyst for exhaust gas purification was produced by the same process as in Example 1 except for using tantalum oxide in place of copper oxide. This catalyst is hereinafter referred to as the catalyst of Example 14.

EXAMPLE 15

A catalyst for exhaust gas purification was produced by the same process as in Example 1 except for using chromium oxide in place of copper oxide. This catalyst is hereinafter referred to as the catalyst of Example 15.

EXAMPLE 16

A catalyst for exhaust gas purification was produced by the same process as in Example 1 except for using molybdenum oxide in place of copper oxide. This catalyst is hereinafter referred to as the catalyst of Example 16.

EXAMPLE 17

A catalyst for exhaust gas purification was produced by the same process as in Example 1 except for using tungsten oxide in place of copper oxide. This catalyst is hereinafter referred to as the catalyst of Example 17.

EXAMPLE 18

A catalyst for exhaust gas purification was produced by the same process as in Example 1 except for using manganese oxide in place of copper oxide. This catalyst is hereinafter referred to as the catalyst of Example 18.

EXAMPLE 19

A catalyst for exhaust gas purification was produced by the same process as in Example 1 except for using iron oxide in place of copper oxide. This catalyst is hereinafter referred to as the catalyst of Example 19.

EXAMPLE 20

A catalyst for exhaust gas purification was produced by the same process as in Example 1 except for using cobalt oxide in place of copper oxide. This catalyst is hereinafter referred to as the catalyst of Example 20.

EXAMPLE 21

A catalyst for exhaust gas purification was produced by the same process as in Example 1 except for using nickel oxide in place of copper oxide. This catalyst is hereinafter referred to as the catalyst of Example 21.

EXAMPLE 22

A catalyst for exhaust gas purification was produced by the same process as in Example 1 except for using zinc oxide in place of copper oxide. This catalyst is hereinafter referred to as the catalyst of Example 22.

EXAMPLE 23

A catalyst for exhaust gas purification was produced by the same process as in Example 1 except for using gallium oxide in place of copper oxide. This catalyst is hereinafter referred to as the catalyst of Example 23.

EXAMPLE 24

A catalyst for exhaust gas purification was produced by the same process as in Example 1 except for using tin oxide in place of copper oxide. This catalyst is hereinafter referred to as the catalyst of Example 24.

EXAMPLE 25

A catalyst for exhaust gas purification was produced by the same process as in Example 1 except for using lead oxide in place of copper oxide. This catalyst is hereinafter referred to as the catalyst of Example 25.

Comparative Example 5

A catalyst for exhaust gas purification composed of only vanadium oxide powder was produced by the same process as in Example 1. This catalyst is hereinafter referred to as the catalyst of Comparative Example 5.

Comparative Example 6

A catalyst for exhaust gas purification composed of only niobium oxide powder was produced by the same process as in Example 1. This catalyst is hereinafter referred to as the catalyst of Comparative Example 6.

Comparative Example 7

A catalyst for exhaust gas purification composed of only tantalum oxide powder was produced by the same process as in Example 1. This catalyst is hereinafter referred to as the catalyst of Comparative Example 7.

Comparative Example 8

A catalyst for exhaust gas purification composed of only chromium oxide powder was produced by the same process as in Example 1. This catalyst is hereinafter referred to as the catalyst of Comparative Example 8.

Comparative Example 9

A catalyst for exhaust gas purification composed of only molybdenum oxide powder was produced by the same process as in Example 1. This catalyst is hereinafter referred to as the catalyst of Comparative Example 9.

Comparative Example 10

A catalyst for exhaust gas purification composed of only tungsten oxide powder was produced by the same process as in Example 1. This catalyst is hereinafter referred to as the catalyst of Comparative Example 10.

Comparative Example 11

A catalyst for exhaust gas purification composed of only manganese oxide powder was produced by the same process as in Example 1. This catalyst is hereinafter referred to as the catalyst of Comparative Example 11.

Comparative Example 12

A catalyst for exhaust gas purification composed of only iron oxide powder was produced by the same process as in Example 1. This catalyst is hereinafter referred to as the catalyst of Comparative Example 12.

Comparative Example 13

A catalyst for exhaust gas purification composed of only cobalt oxide powder was produced by the same process as in Example 1. This catalyst is hereinafter referred to as the catalyst of Comparative Example 13.

Comparative Example 14

A catalyst for exhaust gas purification composed of only nickel oxide powder was produced by the same process as

15 in Example 1. This catalyst is hereinafter referred to as the catalyst of Comparative Example 14.

Comparative Example 15

A catalyst for exhaust gas purification composed of only zinc oxide powder was produced by the same process as in Example 1. This catalyst is hereinafter referred to as the catalyst of Comparative Example 15.

Comparative Example 16

A catalyst for exhaust gas purification composed of only gallium oxide powder was produced by the same process as in Example 1. This catalyst is hereinafter referred to as the catalyst of Comparative Example 16.

Comparative Example 17

A catalyst for exhaust gas purification composed of only tin oxide powder was produced by the same process as in Example 1. This catalyst is hereinafter referred to as the catalyst of Comparative Example 17.

Comparative Example 18

A catalyst for exhaust gas purification composed of only lead oxide powder was produced by the same process as in Example 1. This catalyst is hereinafter referred to as the catalyst of Comparative Example 18.

Evaluation Example 4

The catalysts of Examples 12 to 25 and Comparative Examples 5 to 18 were subjected to a combustion experiment by the same method as in Evaluation Example 1.

Table 4 shows the 10% combustion temperatures of the catalysts of Examples 12 to 25 and Comparative Examples 5 to 18.

It was proved that as shown in Table 4, all of the catalysts of Examples 12 to 25 have lower 10% combustion temperatures, namely, a higher catalytic activities compared with the catalyst of Comparative Examples 5 to 18. In particular, it was found that when cesium sulfate is blended, catalysts for exhaust gas purification having higher catalytic activities can be obtained not only by using copper oxide (Example 1) as shown in Table 1 but also by using vanadium oxide (Example 12) or molybdenum oxide (Example 16) as a metal oxide.

Experiment 1 to Experiment 7

Copper oxide powder and vanadium oxide powder were mixed in various ratios so that the atomic ratio of Cu to V were set at 1:5, 1:2, 1:1, 3:2, 5:2, 4:1, or 5:1. Each of the mixtures thus obtained was heat-treated in an electric furnace at 900° C. for 5 hours, whereby catalysts composed of each of complex metal oxides of Cu and V having various compositions were produced. The catalysts are hereinafter referred to as the catalysts of Experiment 1 to Experiment 7.

Evaluation Example 5

The catalysts of Experiment 1 to Experiment 7 were subjected to a combustion experiment by the same method as in Evaluation Example 1.

Table 5 shows the 10% combustion temperatures of the catalysts of Experiment 1 to Experiment 7.

It was proved that as shown in Table 5, the catalysts composed of each complex metal oxide of Cu and V with the atomic ratio of Cu to V is 1:1 to 4:1 have low 10% combustion temperatures, i.e., high activities.

EXAMPLE 26

For comparing the catalytic activity of the catalysts of Experiment 1 to Experiment 7, i.e., those composed of each complex metal oxide of Cu and V with the catalytic activity of a catalyst obtained by mixing a sulfate with a complex metal oxide of Cu and V, the following catalyst for exhaust gas purification was produced.

First, copper sulfate and vanadium oxide sulfate were dissolved in water so that the atomic ratio of Cu to V was set at 1:1, and the resulting solution was evaporated to dryness and then heat-treated in an electric furnace at 900° C. for 5 hours to prepare a complex metal oxide having a theoretical composition $CuVO_3$. Powder of the complex metal oxide was suspended in an aqueous cesium sulfate solution so that the molar ratio of $Cs_2SO_4$ to $CuVO_3$ was set at 1:1. The resulting suspension was evaporated to dryness and then heat-treated in an electric furnace at 900° C. for 5 hours to obtain a catalyst for exhaust gas purification. This catalyst is hereinafter referred to as the catalyst of Example 26.

EXAMPLE 27

Copper sulfate and vanadium oxide sulfate were dissolved in water so that the atomic ratio of Cu to V was set at 3:2, and the resulting solution was evaporated to dryness and then heat-treated in an electric furnace at 900° C. for 5 hours to prepare a complex metal oxide having a theoretical composition $Cu_3V_2O_8$. Powder of the complex metal oxide was suspended in an aqueous cesium sulfate solution so that the molar ratio of $Cs_2SO_4$ to $Cu_3V_2O_8$ was set at 1:1. The resulting suspension was evaporated to dryness and then heat-treated in an electric furnace at 900° C. for 5 hours to obtain a catalyst for exhaust gas purification. This catalyst is hereinafter referred to as the catalyst of Example 27.

EXAMPLE 28

Copper sulfate and vanadium oxide sulfate were dissolved in water so that the atomic ratio of Cu to V was set at 5:2, and the resulting solution was evaporated to dryness and then heat-treated in an electric furnace at 900° C. for 5 hours to prepare a complex metal oxide having a theoretical composition $Cu_5V_2O_{10}$. Powder of the complex metal oxide was suspended in an aqueous cesium sulfate solution so that the molar ratio of $Cs_2SO_4$ to $Cu_5V_2O_{10}$ was set at 1:1. The resulting suspension was evaporated to dryness and then heat-treated in an electric furnace at 900° C. for 5 hours to obtain a catalyst for exhaust gas purification. This catalyst is hereinafter referred to the catalyst of Example 28.

Evaluation Example 6

The catalysts of Example 26 to Example 28 were subjected to a combustion experiment by the same method as in Evaluation Example 1.

Table 6 shows the 10% combustion temperatures of the catalysts of Example 26 to Example 28.

As is clear from comparison between Table 5 and Table 6, the catalysts of the present invention which comprise a complex metal oxide of Cu and V and cesium sulfate have lower 10% combustion temperatures irrespective of the ratios of Cu and V in the complex metal oxide compared with the catalysts composed of a complex metal oxide of Cu and V in a ratio at which a high catalytic activity can be attained. Thus, it was found that the addition of cesium sulfate further improves the catalytic activity. In addition, from comparison between the results shown in Table 1, Table 2 and Table 4 and those shown in Table 6, it was proved that as a metal oxide to be blended with sulfate, complex metal oxides of Cu and V are especially excellent for improving the catalytic activity.

Experiment 8 to Experiment 14

Copper oxide powder and molybdenum oxide powder were mixed in various ratios so that the atomic ratio of Cu to Mo were set at 1:5, 1:2, 1:1, 3:2, 5:2, 4:1, or 5:1. Each of the mixtures thus obtained was heat-treated in an electric furnace at 900° C. for 5 hours, whereby catalysts composed of each of complex metal oxides of Cu and V having various compositions were produced. The catalysts are hereinafter referred to as the catalysts of Experiment 8 to Experiment 14.

Evaluation Example 7

The catalysts for exhaust gas purification of Experiment 8 to Experiment 14 were subjected to a combustion experiment by the same method as in Evaluation Example 1.

Table 7 shows the 10% combustion temperatures of the catalysts for exhaust gas purification of Experiment 8 to Experiment 14.

It was proved that as shown in Table 7, the catalysts composed of each complex metal oxide of Cu and Mo have low 10% combustion temperatures, i.e., high activities when the atomic ratio of Cu to Mo is 1:1 to 4:1.

EXAMPLE 29

For comparing the catalytic activity of the catalysts of Experiment 8 to Experiment 14, i.e., those composed of each complex metal oxide of Cu and Mo with the catalytic activity of a catalyst for exhaust gas purification obtained by mixing a sulfate with a complex metal oxide of Cu and Mo, the following catalyst for exhaust gas purification was produced.

First, copper oxide powder and molybdenum oxide powder were mixed so that the atomic ratio of Cu to Mo was set at 1:1, and the resulting mixture was heat-treated in an electric furnace at 900° C. for 5 hours to prepare a complex metal oxide having a theoretical composition $CuMoO_4$. Powder of the complex metal oxide was suspended in an aqueous cesium sulfate solution so that the molar ratio of $Cs_2SO_4$ to $CuMoO_4$ was set at 1:1. The resulting suspension was evaporated to dryness and then heat-treated in an electric furnace at 900° C. for 5 hours to obtain a catalyst for exhaust gas purification. This catalyst is hereinafter referred to as the catalyst of Example 29.

EXAMPLE 30

Copper oxide powder and molybdenum oxide powder were mixed so that the atomic ratio of Cu to Mo was set at 3:2, and the resulting mixture was heat-treated in an electric furnace at 900° C. for 5 hours to prepare a complex metal oxide having a theoretical composition $Cu_3Mo_2O_9$. Powder of the complex metal oxide was suspended in an aqueous cesium sulfate solution so that the molar ratio of $Cs_2SO_4$ to $Cu_3Mo_2O_9$ was set at 1:1. The resulting suspension was evaporated to dryness and then heat-treated in an electric furnace at 900° C. for 5 hours to obtain a catalyst for exhaust gas purification. This catalyst is hereinafter referred to as the catalyst of Example 30.

EXAMPLE 31

Copper oxide powder and molybdenum oxide powder were mixed so that the atomic ratio of Cu to Mo was set at 2:1, and the resulting mixture was heat-treated in an electric furnace at 900° C. for 5 hours to prepare a complex metal oxide having a theoretical composition $Cu_2MoO_5$. Powder of the complex metal oxide was suspended in an aqueous cesium sulfate solution so that the molar ratio of $Cs_2SO_4$ to $Cu_2MoO_5$ was set at 1:1. The resulting suspension was evaporated to dryness and then heat-treated in an electric furnace at 900° C. for 5 hours to obtain a catalyst for exhaust gas purification. This catalyst is hereinafter referred to the catalyst of Example 31.

Evaluation Example 8

The catalysts of Example 29 to Example 31 were subjected to a combustion experiment by the same method as in Evaluation Example 1.

Table 8 shows the 10% combustion temperatures of the catalysts of Example 29 to Example 31.

As is clear from comparison between Table 8 and Table 7, the catalysts of the present invention which comprise a complex metal oxide of Cu and Mo and cesium sulfate have lower 10% combustion temperatures irrespective of the ratios of Cu and Mo in the complex metal oxide compared with the catalysts composed of a complex metal oxide of Cu and Mo in a ratio at which a high catalytic activity can be attained. Thus, it was found that the addition of cesium sulfate further improves the catalytic activity. In addition, from comparison between the results shown in Table 1, Table 2 and Table 4 and those shown in Table 8, it was proved that as a metal oxide to be blended with sulfate, complex metal oxides of Cu and Mo are also excellent for improving the catalytic activity like complex metal oxides of Cu and V.

EXAMPLES 32 to 39

On the basis of the results shown in Table 6 and Table 8, a complex metal oxide of Cu and V with a theoretical composition $Cu_5V_2O_{10}$ having a high catalytic activity was selected from the complex metal oxides to be blended with cesium sulfate. Powder of the selected complex metal oxide was suspended in an aqueous cesium sulfate solution so that the molar ratio of $Cu_5V_2O_{10}$ to $Cs_2SO_4$ was set at 10:1, 9:1, 5:1, 2:1, 1:2, 1:5, 1:9, or 1:10. Each of the suspensions thus obtained was evaporated to dryness and then heat-treated in an electric furnace at 900° C. for 5 hours, whereby catalysts comprising the complex metal oxide of Cu and V and cesium sulfate in various ratios were produced. The catalysts are hereinafter referred to as the catalysts of Example 32 to Example 39.

Evaluation Example 9

The catalysts for exhaust gas purification of Example 32 to Example 39 were subjected to a combustion experiment by the same method as in Evaluation Example 1.

Table 9 shows the 10% combustion temperatures of the catalysts of Example 32 to Example 39.

As shown in Table 9, the minimum value of the 10% combustion temperatures exists in a composition range of Example 32 to Example 39. It was found that from the viewpoint of catalytic activity, the molar ratio of $Cu_5V_2O_{10}$ to $Cs_2SO_4$ is preferably 9:1 to 1:9, more preferably 2:1 to 1:5, most preferably 1:1 to 1:2.

EXAMPLEs 40 to 47

As described in Evaluation Example 2, the addition of Pt besides a metal oxide and a sulfate further improves the catalytic activity. Therefore, the improvement of the catalytic activity by the addition of Pt was investigated also for the catalysts of Example 32 to Example 39.

On the basis of the results shown in Table 9, the molar ratio of $Cu_5V_2O_{10}$ to $Cs_2SO_4$ was adjusted to 1:2 at which the 10% combustion temperature was the lowest. Mixed powder of $Cu_5V_2O_{10}$ and $Cs_2SO_4$ was prepared in the same manner as in Example 36 and suspended in an aqueous platinum chloride solution so that the molar ratios of $Cu_5V_2O_{10}$ to Pt were set at 1000:1, 100:1, 30:1, 15:1, 10:1, 3:1, 1:1, or 1:2. Each of the suspensions thus obtained was evaporated to dryness and then heat-treated in an electric furnace at 900° C. for 5 hours, whereby catalysts for exhaust gas purification comprising the mixed powder of $Cu_5V_2O_{10}$ and $CsSO_4$ and Pt in various ratios were produced. The catalysts are hereinafter referred to as the catalysts of Example 40 to Example 47.

Evaluation Example 10

The catalysts of Example 40 to Example 47 were subjected to a combustion experiment by the same method as in Evaluation Example 1.

Table 10 shows the 10% combustion temperatures of the catalysts of Example 40 to Example 47.

As shown in Table 10, the minimum value of the 10% combustion temperatures exists in a composition range of Example 40 to Example 47. It was proved that the improvement of the catalytic activity by the addition of Pt can be effected only by adding Pt in a specific proportion. It was found that as to the amount of Pt added, the molar ratio of $Cu_5V_2O_{10}$ to Pt is preferably 100:1 to 3:1, more preferably 30:1 to 10:1.

EXAMPLE 48

For investigating the burning characteristics of particulates in an exhaust gas purifying filter supporting the catalyst of the present invention, the following exhaust gas purifying filter was produced.

First, an aqueous solution was prepared as a first catalyst solution by dissolving 25 g of copper sulfate and 62.5 g of vanadium oxide sulfate in 3 liters of pure water. A ceramic honeycomb filter made of cordierite (C-558, mfd. by NGK) was immersed in the first catalyst solution. The ceramic honeycomb filter having the first catalyst solution adhered thereto was taken out, and the first catalyst solution adhered was freeze-dried using liquid nitrogen.

Next, the ceramic honeycomb filter was set in a vacuum freeze-drying apparatus (mfd. by KYOWA VACUUM ENGINEERING Co., LTD.) and the flozen water in the first catalyst solution was sublimed. Then, the ceramic honeycomb filter was heat-treated in an electric furnace at 900° C. for 5 hours to support a complex metal oxide of Cu and V uniformly on the surface of the ceramic honeycomb filter.

The weight percentage of the complex metal oxide of Cu and V after the heat-treatment supported by the use of the first catalyst solution was 2.5 wt % based on the weight of the ceramic honeycomb filter.

Subsequently, a second catalyst solution was prepared by dissolving 20 g of cesium sulfate in 3 liters of pure water, and the ceramic honeycomb filter supporting the complex metal oxide of Cu and V was immersed in the second catalyst solution. The ceramic honeycomb filter having the second catalyst solution adhered thereto was taken out, and the second catalyst solution adhered was freeze-dried using liquid nitrogen.

Then, the ceramic honeycomb filter was set in a vacuum freeze-drying apparatus (mfd. by KYOWA VACUUM ENGINEERING Co., LTD.) and the flozen water in the second catalyst solution was sublimed. Thereafter, the ceramic honeycomb filter was heat-treated in an electric furnace at 900° C. for 5 hours to support cesium sulfate uniformly on the surface of the ceramic honeycomb filter. The weight percentage of cesium sulfate after the heat-treatment supported by the use of the second catalyst solution was 2.5 wt % based on the weight of the ceramic honeycomb filter.

Thus, there was produced exhaust gas purifying filter supporting a catalyst for exhaust gas purification comprising the complex metal oxide and cesium sulfate, in a total amount of 5 wt % based on the weight of the ceramic honeycomb filter. This filter is hereinafter referred to as the filter of Example 48.

EXAMPLE 49

An exhaust gas purifying filter supporting a catalyst comprising a complex metal oxide of Cu and V and cesium sulfate, in a total amount of 10 wt % based on the weight of a ceramic honeycomb filter was produced by the same process as in Example 48 except for using a solution of 50 g of copper sulfate and 125 g of vanadium oxide sulfate in 3 liters of pure water as a first catalyst solution and a solution of 40 g of cesium sulfate in 3 liters of pure water as a second catalyst solution. This filter is hereinafter referred to as the filter of Example 49.

EXAMPLE 50

An exhaust gas purifying filter supporting a catalyst comprising a complex metal oxide of Cu and V and cesium sulfate, in a total amount of 20 wt % based on the weight of a ceramic honeycomb filter was produced by the same process as in Example 48 except for using a solution of 100 g of copper sulfate and 250 g of vanadium oxide sulfate in 3 liters of pure water as a first catalyst solution and a solution of 80 g of cesium sulfate in 3 liters of pure water as a second catalyst solution. This filter is hereinafter referred to as the filter of Example 50.

EXAMPLE 51

An exhaust gas purifying filter supporting a catalyst comprising a complex metal oxide of Cu and V and cesium sulfate, in a total amount of 30 wt % based on the weight of a ceramic honeycomb filter was produced by the same process as in Example 48 except for using a solution of 150 g of copper sulfate and 375 g of vanadium oxide sulfate in 3 liters of pure water as a first catalyst solution and a solution of 120 g of cesium sulfate in 3 liters of pure water as a second catalyst solution. This filter is hereinafter referred to as the filter of Example 51.

EXAMPLE 52

An exhaust gas purifying filter supporting a catalyst comprising a complex metal oxide of Cu and V and cesium sulfate, in a total amount of 40 wt % based on the weight of a ceramic honeycomb filter was produced by the same process as in Example 48 except for using a solution of 200 g of copper sulfate and 500 g of vanadium oxide sulfate in 3 liters of pure water as a first catalyst solution and a solution of 160 g of cesium sulfate in 3 liters of pure water as a second catalyst solution. This filter is hereinafter referred to as the filter of Example 52.

EXAMPLE 53

An exhaust gas purifying filter supporting a catalyst comprising a complex metal oxide of Cu and V and cesium sulfate, in a total amount of 50 wt % based on the weight of a ceramic honeycomb filter was produced by the same process as in Example 48 except for using a solution of 250 g of copper sulfate and 625 g of vanadium oxide sulfate in 3 liters of pure water as a first catalyst solution and a solution of 200 g of cesium sulfate in 3 liters of pure water as a second catalyst solution. This filter is hereinafter referred to as the filter of Example 53.

Evaluation Example 11

Each of the filters of Example 48 to Example 53 was subjected to the following exhaust gas purification test.

Each filter was set in the exhaust system of a diesel engine with a displacement of 3,431 cc: The diesel engine was operated for 1 hour at 1,500 rpm and at a torque of 21 kg·m. During the operation of the diesel engine, particulates in exhaust gas were collected by means of the filter. The pressure in the filter was measured with a pressure sensor set inside of the filter at the exhaust gas influx side while burning the particulates. The difference between the measured pressure and atmospheric pressure was calculated. In the above exhaust gas purification test, the particulates were burned and oxidized at the exhaust gas temperature. That is, a heating means such as an electric heater is not used for heating the exhaust gas or the filter.

With reference to FIG. 1, there is explained below the change of the pressure difference from the start of operation of the diesel engine in the case of using each of the filters of Example 48 to Example 53.

FIG. 1 is a graph showing the change with time of the difference between atmospheric pressure and exhaust gas pressure in each of the filters of Examples 48 to 53. As shown in FIG. 1, in the case of the filter supporting a catalyst in an amount of 5 wt % (Example 48), the pressure difference increased in the early stage of about 10 minutes after the start of operation of the diesel engine and showed tendency to increase continuously also after the early stage. Thus, the following was found: when the weight percentage of the catalyst was less than 5 wt %, the amount of the catalyst supported would not be sufficient and hence there would be a fear that it may becomes impossible to remove the collected particulates in the exhaust gas by burning them sufficiently. In the case of the filter supporting a catalyst in an amount of 50 wt % (Example 53), the pressure difference reached 300 mmHg in the early stage of about 10 minutes after the start of operation of the diesel engine. From this fact, it became clear that when the weight percentage of the catalyst for exhaust gas purification is more than 50 wt %, the back pressure increases and tends to apply an excessive load to the diesel engine.

From these results, it was found that the amount of the catalyst for exhaust gas purification in the exhaust gas purifying filter is preferably 5 wt % to 50 wt %, more preferably 10 wt % to 40 wt %, based on the weight of the ceramic honeycomb filter used as a carrier.

EXAMPLE 54

An exhaust gas purifying filter supporting a catalyst comprising a complex metal oxide of Cu and V and cesium sulfate, in a total amount of 15 wt % based on the weight of a ceramic honeycomb filter was produced by the same process as in Example 48 except for using a solution of 75 g of copper sulfate and 188 g of vanadium oxide sulfate in 3 liters of pure water as a first catalyst solution and a solution of 60 g of cesium sulfate in 3 liters of pure water as a second catalyst solution. This filter is hereinafter referred to as the filter of Example 54.

Comparative Example 5

An exhaust gas purifying filter composed only the same ceramic honeycomb filter as used in Example 48 is hereinafter referred to as the filter of Comparative Example 5.

Evaluation Example 12

The filters of Example 54 and Comparative Example 5 were subjected to an exhaust gas purification test by the same method as in Evaluation Example 11. The change of the pressure difference from the start of operation of the diesel engine in the case of using each exhaust gas purifying filter is explained below with reference to FIG. 2.

Figure 2:
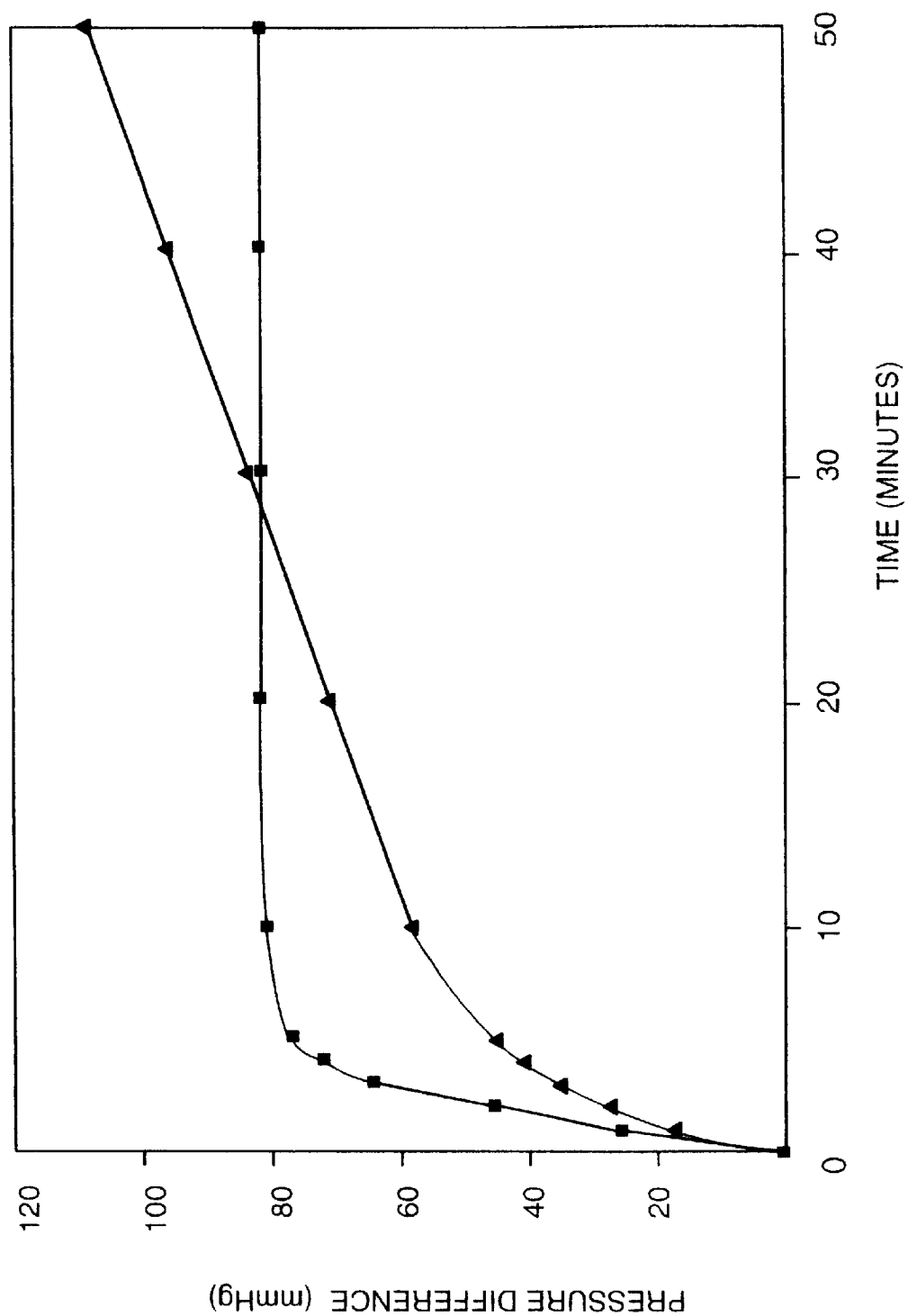
FIG. 2 is a graph showing the change with time of the difference between atmospheric pressure and exhaust gas pressure in each of the exhaust gas purifying filters of Example 54 and Comparative Example 5.
Figure 3:
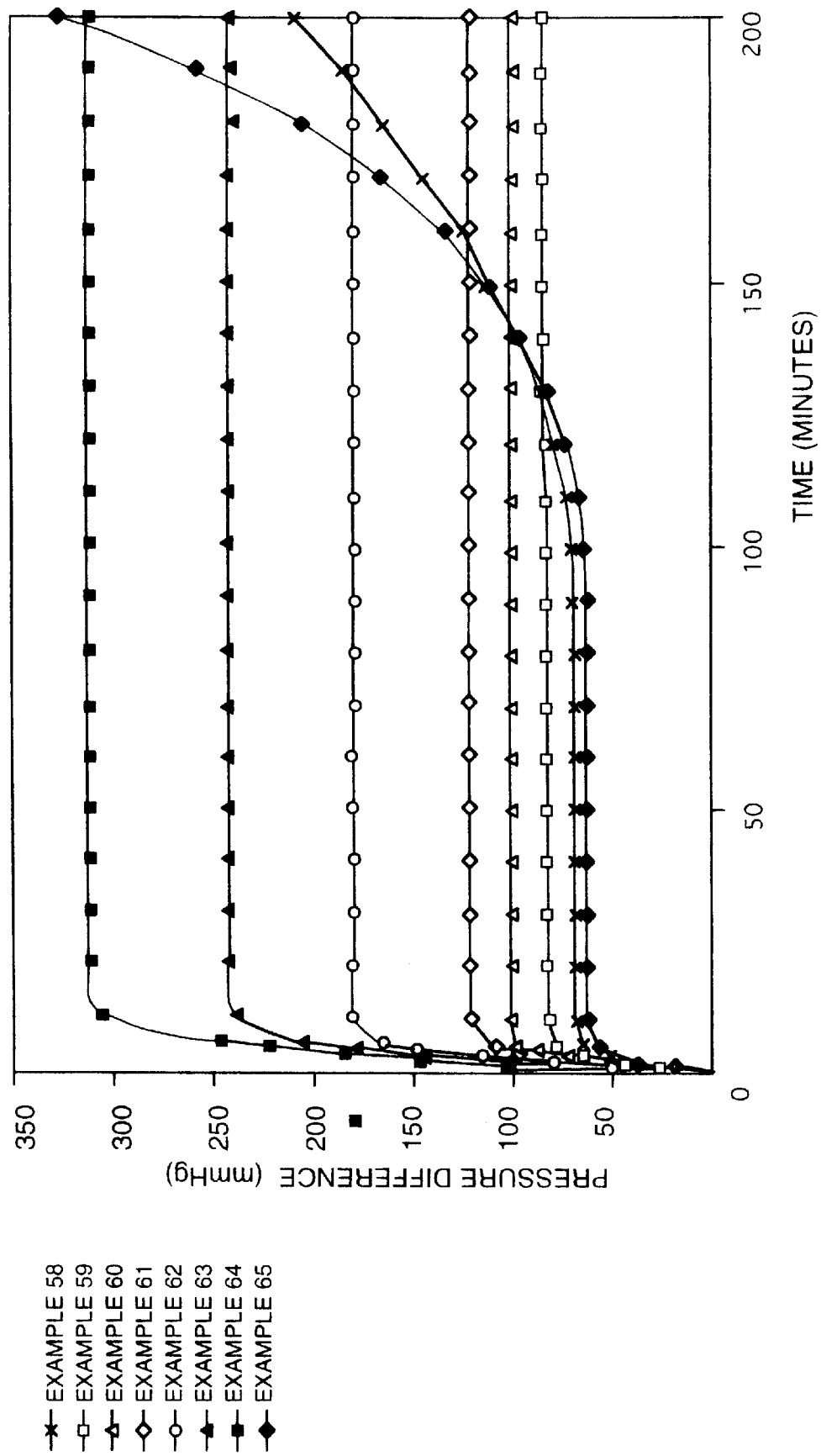
FIG. 3 is a graph showing the change with time of the difference between atmospheric pressure and exhaust gas pressure in each of the exhaust gas purifying filters of Examples 58 to 65.
Figure 4:
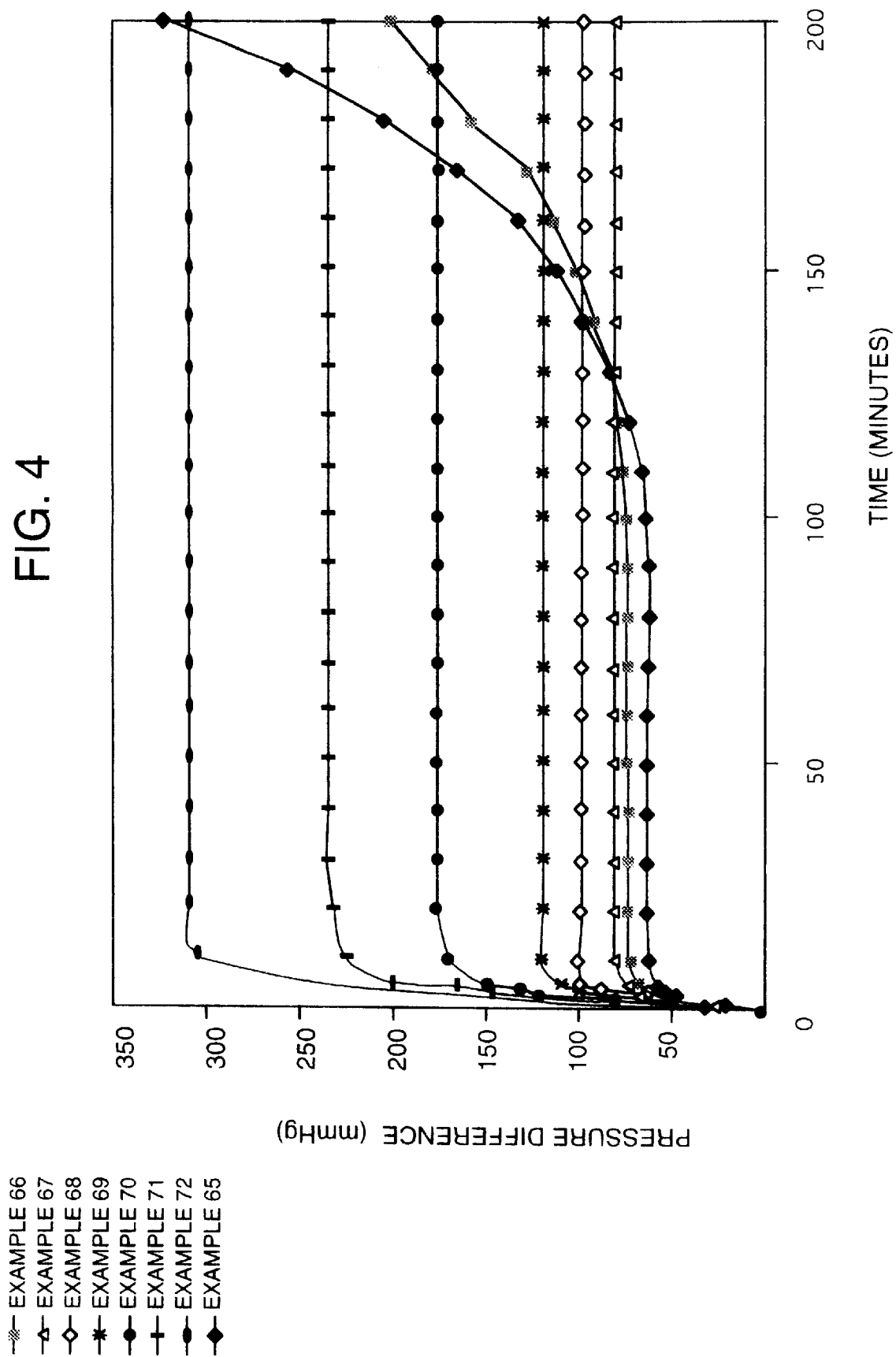
FIG. 4 is a graph showing the change with time of the difference between atmospheric pressure and exhaust gas pressure in each of the exhaust gas purifying filters of Example 65 and Examples 66 to 72.
Figure 5:
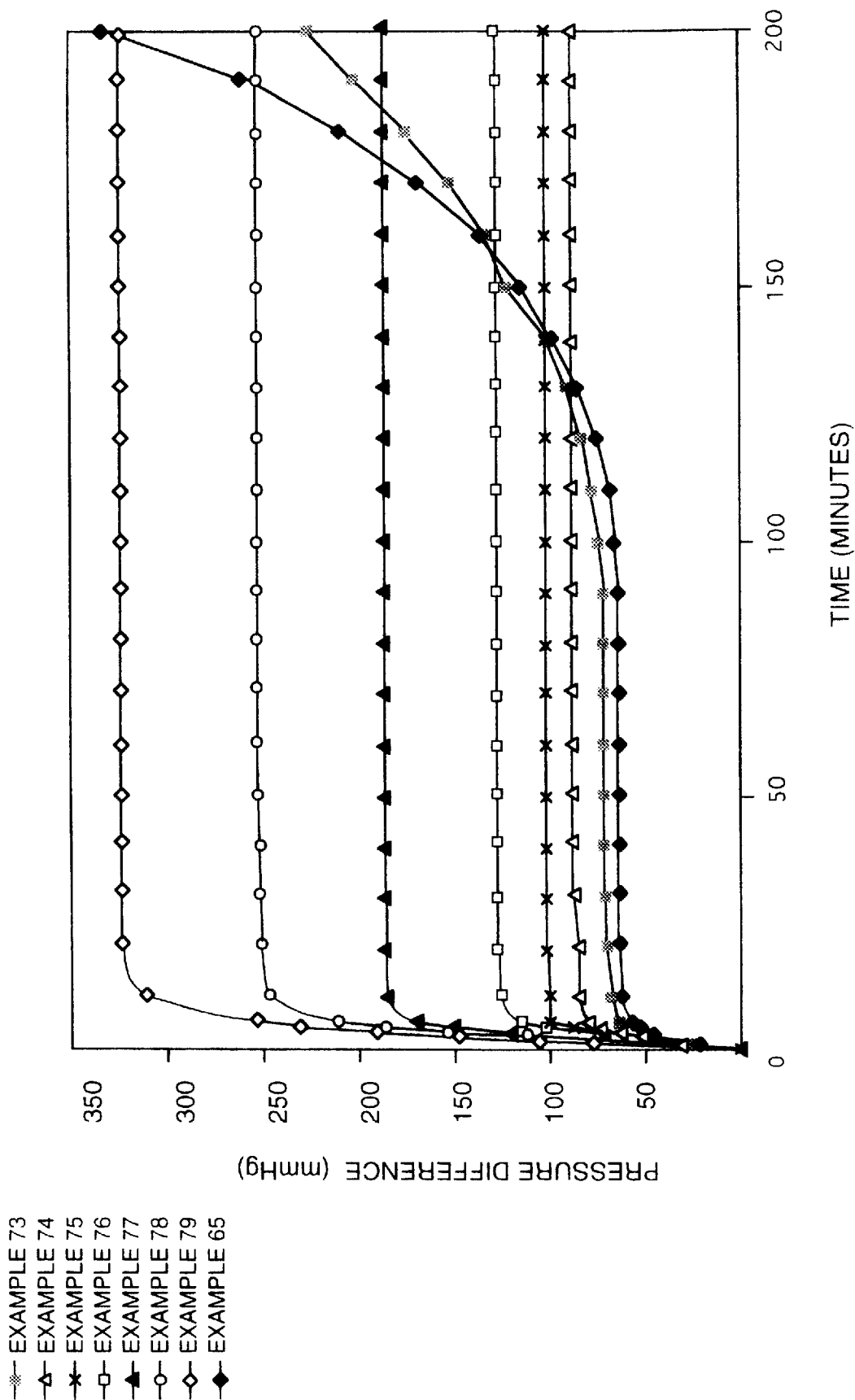
FIG. 5 is a graph showing the change with time of the difference between atmospheric pressure and exhaust gas pressure in each of the exhaust gas purifying filters of Example 65 and Examples 73 to 79.
Figure 6:
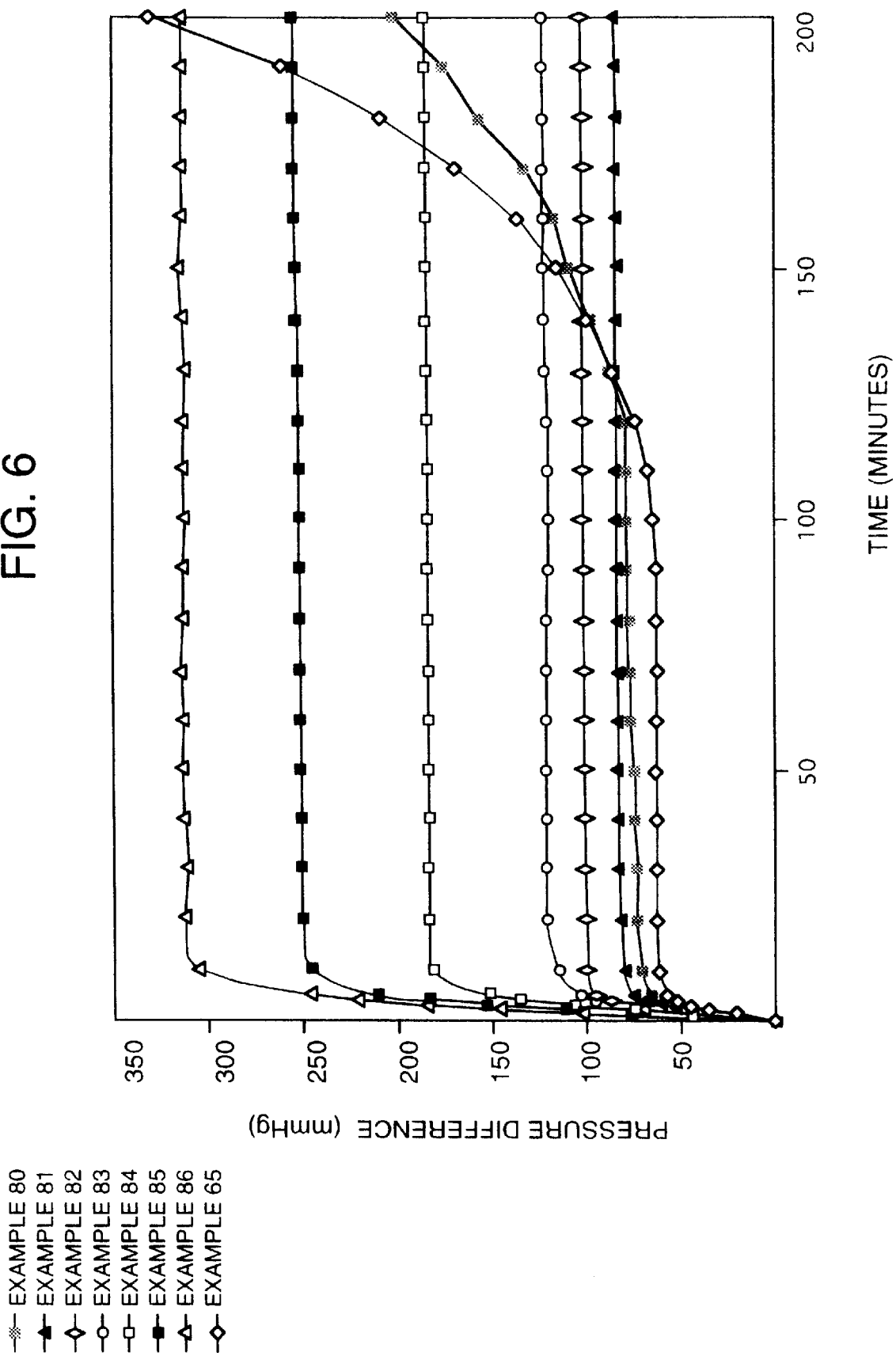
FIG. 6 is a graph showing the change with time of the difference between atmospheric pressure and exhaust gas pressure in each of the exhaust gas purifying filters of Example 65 and Examples 80 to 86.

FIG. 2 is a graph showing the change with time of the difference between atmospheric pressure and exhaust gas pressure in each of the filters of Example 54 and Comparative Example 5. As shown in FIG. 2, in the case of the filter of Comparative Example 5 supporting no catalyst for exhaust gas purification, the pressure difference increased with an increase of the amount of particulates collected, after the start of operation of the diesel engine. By contrast, in the case of the filter of Example 54, the pressure difference increased in the early stage of about 5 minutes after the start of operation of the diesel engine but did not change after the early stage. Thus, it was found that particulates collected in this filter are sufficiently burned and oxidized at the exhaust gas temperature to be removed from the filter.

EXAMPLE 55

Copper nitrate and ammonium vanadate were dissolved in deionized water in a molar ratio of 1:1 (Cu:V), and the resulting solution was concentrated to dryness by heating to obtain mixed powder. The mixed powder was heat-treated in an electric furnace at 900° C. for 5 hours to prepare a complex metal oxide of Cu and V. Powder of the complex metal oxide was suspended in an aqueous cesium sulfate solution so that the molar ratio of the complex metal oxide to cesium sulfate was set at 2:1 (Cs:Cu). The resulting suspension was evaporated to dryness and then heat-treated in an electric furnace at 900° C. for 5 hours to obtain a catalyst for exhaust gas purification of. This catalyst is hereinafter referred to as the catalyst of Example 55.

Reference Example 6

Copper nitrate, ammonium vanadate and cesium sulfate were dissolved in deionized water in a molar ratio of 1:1:2 (Cu:V:Cs), and the resulting solution was concentrated to dryness by heating to obtain mixed powder. The mixed powder was heat-treated in an electric furnace at 900° C. for 5 hours to obtain a catalyst for exhaust gas purification. This catalyst is hereinafter referred to as the catalyst of Reference Example 6.

Evaluation Example 13

The catalysts of Example 55 and Reference Example 6 were subjected to a combustion experiment by the same method as in Evaluation Example 1. Consequently, it was found that the 10% combustion temperatures of the catalysts of Example 55 and Reference Example 6 were 370° C. and 400° C., respectively. From these results, it was proved that the activity of the catalyst obtained by adding cesium sulfate to the previously synthesized complex metal oxide of Cu and V is higher than that of the catalyst obtained by dissolving Cu, V and Cs in water at the same time and evaporating the resulting solution to dryness. The reason can be speculated that in the production process of the catalyst of Reference Example 6, Cs reacts with Cu or V to form a compound having a low catalytic activity.

In view of the above results, as a process for producing a catalyst comprising a complex metal oxide, there is preferably adopted a process of synthesizing the complex metal oxide previously and then adding a sulfate thereto.

EXAMPLE 56

The filter of Example 48 was placed in a stainless-steel container having an exhaust gas inlet and an exhaust gas outlet. As to a material for the filter, there was used a ceramic honeycomb filter made of cordierite (C-558, mfd. by NGK) which had a cylindrical shape with an inside diameter of 5.66 inches and a length of 6 inches and had 100 cells per square inch. The stainless-steel container had sufficient dimensions to accommodate the filter. The stainless-steel container containing the filter was set at a distance of 3 m from the engine manifold in exhaust system of a diesel engine with a displacement of 3,431 cc. A pipe (material: iron, bore: 100 mm) connecting the diesel engine to the exhaust gas inlet of the container was wrapped up in a heat insulating material (material: Glass Wool). The diesel engine was operated for 1 hour at a revolution rate of 1,500 rpm and a torque of 21 kg·m, and the temperature of exhaust gas discharged through the exhaust gas outlet of the container was measured. The flow rate was 40 liters/min.

EXAMPLE 57

The exhaust gas temperature was measured using the same apparatus as in Example 56 except that the pipe connecting the diesel engine to the exhaust gas inlet of the container was not wrapped up in the heat insulating material.

Evaluation Example 14

The exhaust gas temperature in Example 56 was 490° C., while that in Example 57 was 440° C. Thus, it was found that the exhaust gas temperature is higher by 50° C. by wrapping the connecting pipe between the diesel engine and the container with the insulating material. Since the exhaust gas temperature can be thus high, a temperature necessary for burning particulates in the filter can be maintained without providing a heating means such as a heater in the apparatus. Even if it is necessary to heat the exhaust gas or the filter by a heating means provided in the apparatus because the initial temperature of the exhaust gas is low, energy consumed by the heating means can be reduced.

Although a case of wrapping the connecting pipe with the heat insulating material is given in Example 56, the same effect as in Example 56 can be obtained by providing the same heat insulating material as in Example 56 on the periphery of the container, or setting the exhaust gas purifying apparatus at a short distance of 1 m or less from the diesel engine manifold.

EXAMPLE 58

A filter of cordierite was impregnated with silica sol, dried in a drier, and then calcined in an electric furnace at 900° C. for 5 hours to be coated with silica. The thickness of the coating layer was adjusted to 1 μm. The thus treated filter was impregnated with an aqueous solution of copper sulfate, vanadium sulfate and cesium sulfate as a mixed aqueous solution of salts of the components of a catalyst, freeze-dried, and then calcined in an electric furnace at 900° C. for 5 hours to produce an exhaust gas purifying filter. This filter is hereinafter referred to as the filter of Example 58.

EXAMPLE 59

An exhaust gas purifying filter was produced by the same process as in Example 58 except for changing the thickness of the coating layer of silica from 1 μm to 5 μm. This filter is hereinafter referred to as the filter of Example 59.

EXAMPLE 60

An exhaust gas purifying filter was produced by the same process as in Example 58 except for changing the thickness of the coating layer of silica from 1 μm to 10 μm. This filter is hereinafter referred to as the filter of Example 60.

EXAMPLE 61

An exhaust gas purifying filter was produced by the same process as in Example 58 except for changing the thickness of the coating layer of silica from 1 μm to 50 μm. This filter is hereinafter referred to as the filter of Example 61.

EXAMPLE 62

An exhaust gas purifying filter was produced by the same process as in Example 58 except for changing the thickness of the coating layer of silica from 1 μm to 100 μm. This filter is hereinafter referred to as the filter of Example 62.

EXAMPLE 63

An exhaust gas purifying filter was produced by the same process as in Example 58 except for changing the thickness of the coating layer of silica from 1 μm to 500 μm. This filter is hereinafter referred to as the filter of Example 63.

EXAMPLE 64

An exhaust gas purifying filter was produced by the same process as in Example 58 except for changing the thickness of the coating layer of silica from 1 μm to 1,000 μm. This filter is hereinafter referred to as the filter of Example 64.

EXAMPLE 65

An exhaust gas purifying filter was produced by the same process as in Example 58 except for changing the thickness of the coating layer of silica from 1 μm to 0 μm, namely, conducting no coating. This filter is hereinafter referred to as the filter of Example 65.

EXAMPLE 66

An exhaust gas purifying filter was produced by the same process as in Example 58 except for forming a coating layer of zirconia in place of the coating layer of silica. This filter is hereinafter referred to as the filter of Example 66.

EXAMPLE 67

An exhaust gas purifying filter was produced by the same process as in Example 59 except for forming a coating layer of zirconia in place of the coating layer of silica. This filter is hereinafter referred to as the filter of Example 67.

EXAMPLE 68

An exhaust gas purifying filter was produced by the same process as in Example 60 except for forming a coating layer of zirconia in place of the coating layer of silica. This filter is hereinafter referred to as the filter of Example 68.

EXAMPLE 69

An exhaust gas purifying filter was produced by the same process as in Example 61 except for forming a coating layer of zirconia in place of the coating layer of silica. This filter is hereinafter referred to as the filter of Example 69.

EXAMPLE 70

An exhaust gas purifying filter was produced by the same process as in Example 62 except for forming a coating layer of zirconia in place of the coating layer of silica. This filter is hereinafter referred to as the filter of Example 70.

EXAMPLE 71

An exhaust gas purifying filter was produced by the same process as in Example 63 except for forming a coating layer of zirconia in place of the coating layer of silica. This filter is hereinafter referred to as the filter of Example 71.

EXAMPLE 72

An exhaust gas purifying filter was produced by the same process as in Example 64 except for forming a coating layer of zirconia in place of the coating layer of silica. This filter is hereinafter referred to as the filter of Example 72.

EXAMPLE 73

An exhaust gas purifying filter was produced by the same process as in Example 58 except for forming a coating layer of titania in place of the coating layer of silica. This filter is hereinafter referred to as the filter of Example 73.

EXAMPLE 74

An exhaust gas purifying filter was produced by the same process as in Example 59 except for forming a coating layer of titania in place of the coating layer of silica. This filter is hereinafter referred to as the filter of Example 74.

EXAMPLE 75

An exhaust gas purifying filter was produced by the same process as in Example 60 except for forming a coating layer of titania in place of the coating layer of silica. This filter is hereinafter referred to as the filter of Example 75.

EXAMPLE 76

An exhaust gas purifying filter was produced by the same process as in Example 61 except for forming a coating layer of titania in place of the coating layer of silica. This filter is hereinafter referred to as the filter of Example 76.

EXAMPLE 77

An exhaust gas purifying filter was produced by the same process as in Example 62 except for forming a coating layer of titania in place of the coating layer of silica. This filter is hereinafter referred to as the filter of Example 77.

EXAMPLE 78

An exhaust gas purifying filter was produced by the same process as in Example 63 except for forming a coating layer of titania in place of the coating layer of silica. This filter is hereinafter referred to as the filter of Example 78.

EXAMPLE 79

An exhaust gas purifying filter was produced by the same process as in Example 64 except for forming a coating layer of titania in place of the coating layer of silica. This filter is hereinafter referred to as the filter of Example 79.

EXAMPLE 80

An exhaust gas purifying filter was produced by the same process as in Example 58 except for forming a coating layer of silica-alumina in place of the coating layer of silica. This filter is hereinafter referred to as the filter of Example 80.

EXAMPLE 81

An exhaust gas purifying filter was produced by the same process as in Example 59 except for forming a coating layer of silica-alumina in place of the coating layer of silica. This filter is hereinafter referred to as the filter of Example 81.

EXAMPLE 82

An exhaust gas purifying filter was produced by the same process as in Example 60 except for forming a coating layer of silica-alumina in place of the coating layer of silica. This filter is hereinafter referred to as the filter of Example 82.

EXAMPLE 83

An exhaust gas purifying filter was produced by the same process as in Example 61 except for forming a coating layer of silica-alumina in place of the coating layer of silica. This filter is hereinafter referred to as the filter of Example 83.

EXAMPLE 84

An exhaust gas purifying filter was produced by the same process as in Example 62 except for forming a coating layer of silica-alumina in place of the coating layer of silica. This filter is hereinafter referred to as the filter of Example 84.

EXAMPLE 85

An exhaust gas purifying filter was produced by the same process as in Example 63 except for forming a coating layer of silica-alumina in place of the coating layer of silica. This filter is hereinafter referred to as the filter of Example 85.

EXAMPLE 86

An exhaust gas purifying filter was produced by the same process as in Example 64 except for forming a coating layer of silica-alumina in place of the coating layer of silica. This filter is hereinafter referred to as the filter of Example 86.

Evaluation Example 15

The filters of Example 58 to Example 86 were subjected to an exhaust gas purification test by the same method as in Evaluation Example 11.

The change of the pressure difference after the start of operation of the diesel engine is explained below with reference to FIG. 3, FIG. 4, FIG. 5 and FIG. 6.

FIG. 3, FIG. 4, FIG. 5 and FIG. 6 are graphs showing the change with time of the difference between atmospheric pressure and exhaust gas pressure in each of the filters of Examples 58 to 65, Examples 66 to 72, Examples 73 to 79, and Examples 80 to 86, respectively. As shown in FIG. 3, FIG. 4, FIG. 5 and FIG. 6, when the filter had no coating (Example 65), the pressure difference began to increase about 100 minutes after the start of operation of the diesel engine and then showed tendency to increase continuously. Also in the case of the exhaust gas purifying filters in which the thickness of the coating layer of silica, zirconia, titania or silica-alumina on the filter was 1 $\mu$m (Example 58, Example 66, Example 73 and Example 80), the pressure difference began to increase about 100 minutes after the start of operation of the diesel engine and then showed tendency to increase continuously. That is, the following was found: when the filter has no coating or the thickness of the coating layer of silica, zirconia, titania or silica-alumina on the filter is less than 1 $\mu$m, Cu, V and Cs as the components of the catalyst in a catalyst layer diffuse into the cordierite filter owing to the heat of exhaust gas from the diesel engine or the heat of reaction of particulates, resulting in deteriorated activity of the catalyst, and hence there is a fear that sufficient combustion and removal of collected particulates in the exhaust gas may become impossible. In the case of the exhaust gas purifying filters in which the thickness of the coating layer of silica, zirconia, titania or silica-alumina was 1,000 $\mu$m, the pressure difference reached 300 mmHg in the early stage of about 10 minutes after the start of operation of the diesel engine. From this fact, it became clear that when the thickness of the coating layer is more than 1,000 $\mu$m, the back pressure increases and tends to apply an excessive load to the diesel engine.

From the above results, it was proved that the thickness of the coating layer of silica, zirconia, titania or silica-alumina as an intermediate layer between the filter and catalyst layer of the exhaust gas purifying filter is preferably 1 $\mu$m to 1,000 $\mu$m, and that the coating prevents the diffusion of Cu, V and Cs as the components of the catalyst into the filter.

EXAMPLE 87

A filter of cordierite was impregnated with silica sol, dried in a drier, and then calcined in an electric furnace at 900° C. for 5 hours to be coated with silica. The thickness of the coating layer was adjusted to 1 $\mu$m. The thus treated filter was impregnated with an aqueous solution of lanthanum acetate, strontium acetate and cobalt acetate in a molar ratio of 0.9:0.1:1 as a mixed aqueous solution of salts of the components of a catalyst, freeze-dried, and then calcined in an electric furnace at 900° C. for 5 hours to produce an exhaust gas purifying filter supporting a catalyst $LaSrCoO_3$. This filter is hereinafter referred to as the filter of Example 87.

EXAMPLE 88

An exhaust gas purifying filter was produced by the same process as in Example 87 except for changing the thickness of the coating layer of silica from 1 $\mu$m to 5 $\mu$m. This filter is hereinafter referred to as the filter of Example 88.

EXAMPLE 89

An exhaust gas purifying filter was produced by the same process as in Example 87 except for changing the thickness of the coating layer of silica from 1 $\mu$m to 10 $\mu$m. This filter is hereinafter referred to as the filter of Example 89.

EXAMPLE 90

An exhaust gas purifying filter was produced by the same process as in Example 87 except for changing the thickness of the coating layer of silica from 1 $\mu$m to 50 $\mu$m. This filter is hereinafter referred to as the filter of Example 90.

EXAMPLE 91

An exhaust gas purifying filter was produced by the same process as in Example 87 except for changing the thickness of the coating layer of silica from 1 $\mu$m to 100 $\mu$m. This filter is hereinafter referred to as the filter of Example 91.

EXAMPLE 92

An exhaust gas purifying filter was produced by the same process as in Example 87 except for changing the thickness of the coating layer of silica from 1 $\mu$m to 500 $\mu$m. This filter is hereinafter referred to as the filter of Example 92.

EXAMPLE 93

An exhaust gas purifying filter was produced by the same process as in Example 87 except for changing the thickness of the coating layer of silica from 1 $\mu$m to 1,000 $\mu$m. This filter is hereinafter referred to as the filter of Example 93.

EXAMPLE 94

An exhaust gas purifying filter was produced by the same process as in Example 87 except for changing the thickness of the coating layer of silica from 1 $\mu$m to 0 $\mu$m, namely, conducting no coating. This filter is hereinafter referred to as the filter of Example 94.

EXAMPLE 95

An exhaust gas purifying filter was produced by the same process as in Example 87 except for forming a coating layer of zirconia in place of the coating layer of silica. This filter is hereinafter referred to as the filter of Example 95.

EXAMPLE 96

An exhaust gas purifying filter was produced by the same process as in Example 88 except for forming a coating layer of zirconia in place of the coating layer of silica. This filter is hereinafter referred to as the filter of Example 96.

EXAMPLE 97

An exhaust gas purifying filter was produced by the same process as in Example 89 except for forming a coating layer of zirconia in place of the coating layer of silica. This filter is hereinafter referred to as the filter of Example 97.

EXAMPLE 98

An exhaust gas purifying filter was produced by the same process as in Example 90 except for forming a coating layer of zirconia in place of the coating layer of silica. This filter is hereinafter referred to as the filter of Example 98.

EXAMPLE 99

An exhaust gas purifying filter was produced by the same process as in Example 91 except for forming a coating layer of zirconia in place of the coating layer of silica. This filter is hereinafter referred to as the filter of Example 99.

EXAMPLE 100

An exhaust gas purifying filter was produced by the same process as in Example 92 except for forming a coating layer of zirconia in place of the coating layer of silica. This filter is hereinafter referred to as the filter of Example 100.

EXAMPLE 101

An exhaust gas purifying filter was produced by the same process as in Example 93 except for forming a coating layer of zirconia in place of the coating layer of silica. This filter is hereinafter referred to as the filter of Example 101.

Evaluation Example 16

The exhaust gas purifying filters of Example 87 to Example 101 were subjected to an exhaust gas purification test by the same method as in Evaluation Example 11.

The change of the pressure difference after the start of operation of the diesel engine is explained below with reference to FIG. 7 and FIG. 8.

Figure 7:
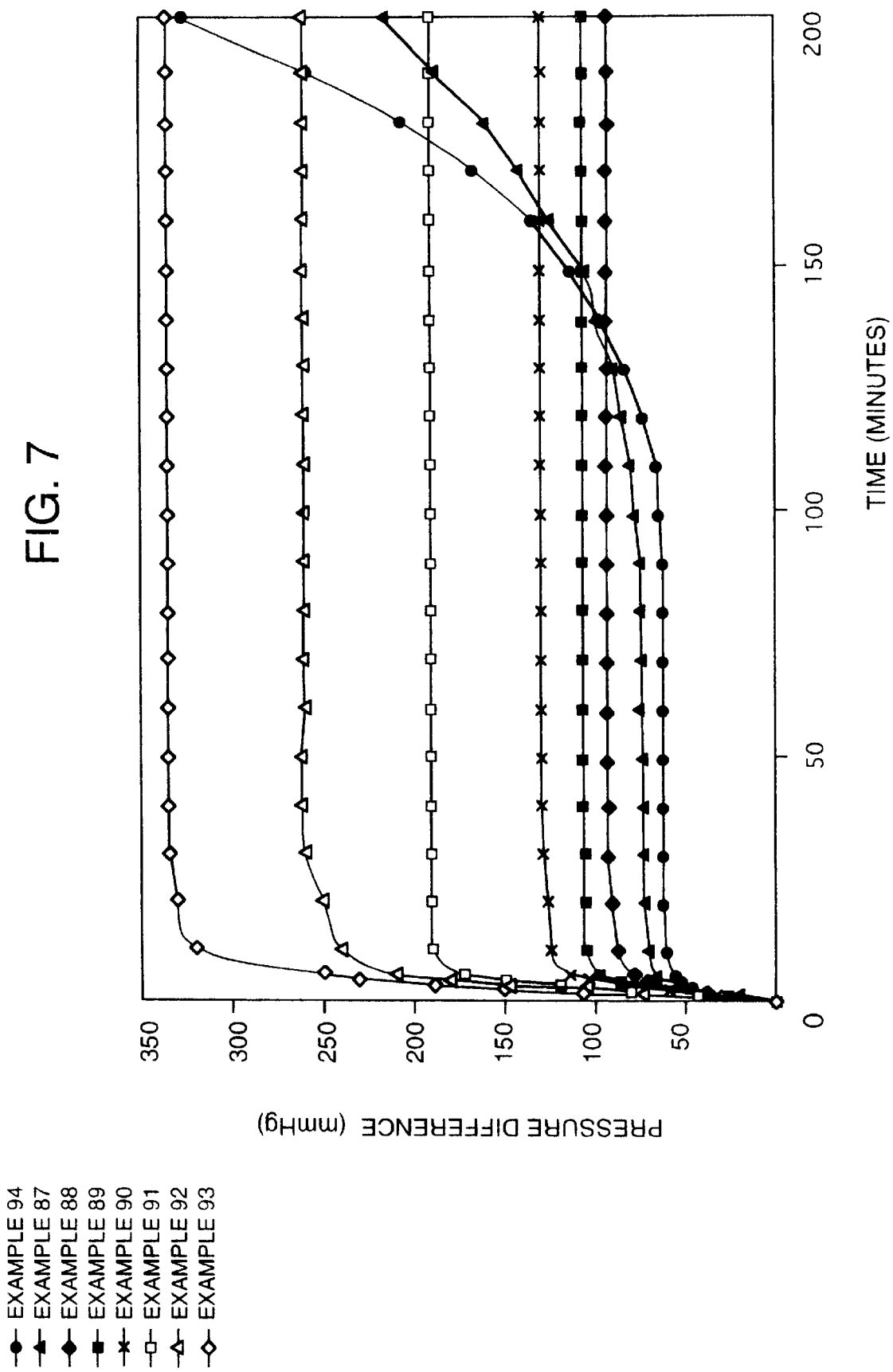
FIG. 7 is a graph showing the change with time of the difference between atmospheric pressure and exhaust gas pressure in each of the exhaust gas purifying filters of Examples 87 to 94.
Figure 8:
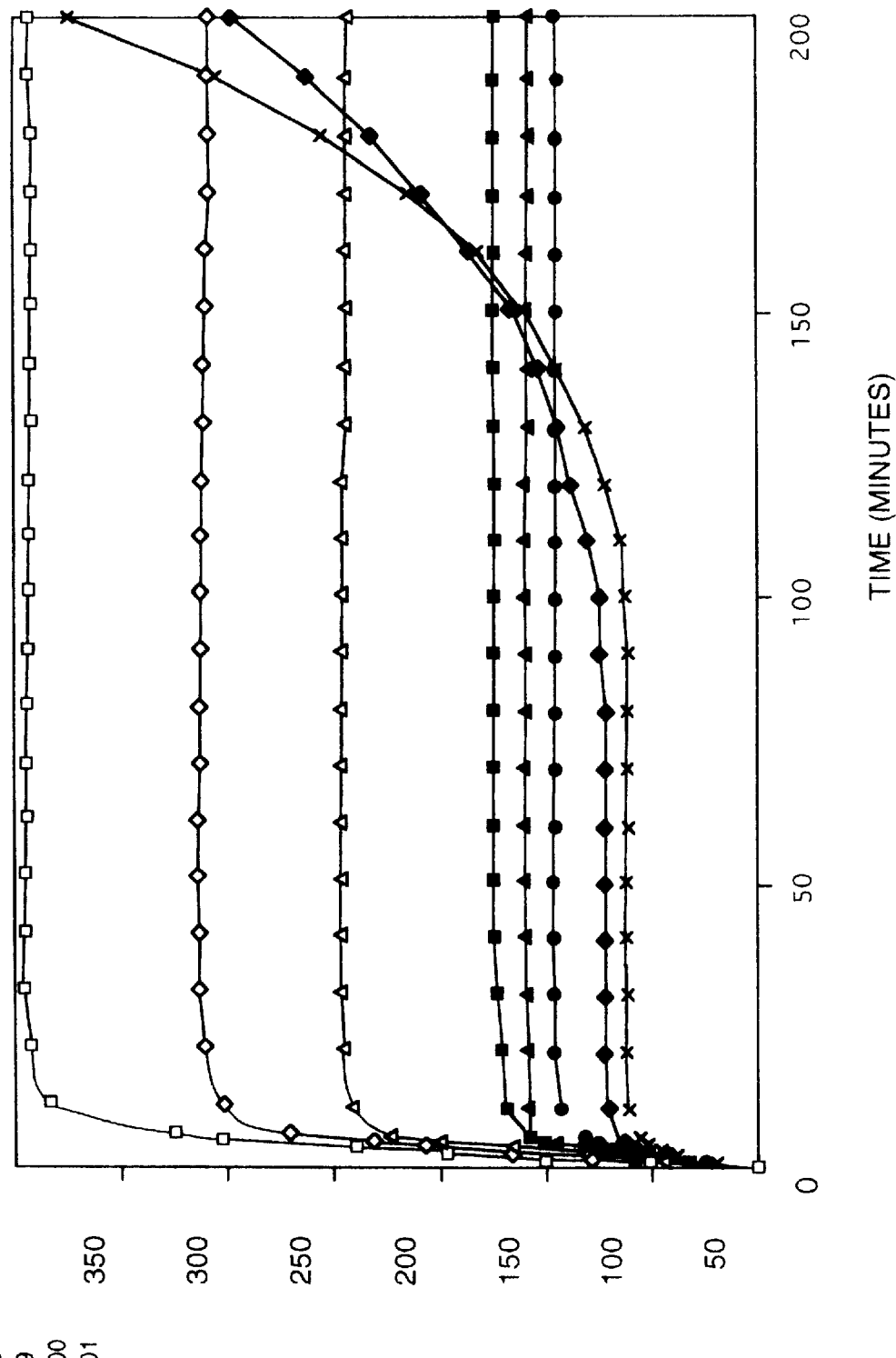
FIG. 8 is a graph showing the change with time of the difference between atmospheric pressure and exhaust gas pressure in each of the exhaust gas purifying filters of Examples 94 to 101.

FIG. 7 and FIG. 8 are graphs showing the change with time of the difference between atmospheric pressure and exhaust gas pressure in each of the exhaust gas purifying filters of Examples 87 to 94 and Examples 94 to 101, respectively. As shown in FIG. 7 and FIG. 8, when the filter had no coating (Example 94), the pressure difference began to increase about 100 minutes after the start of operation of the diesel engine and then showed tendency to increase continuously. Also in the case of the exhaust gas purifying filters in which the thickness of the coating layer of silica or zirconia on the filter was 1 $\mu$m (Example 87 and Example 95), the pressure difference began to increase about 100 minutes after the start of operation of the diesel engine and then showed tendency to increase continuously. That is, the following was found: when the filter has no coating or the thickness of the coating layer of silica or zirconia on the filter is less than 1 $\mu$m, the components of the catalyst in a catalyst layer diffuse into the cordierite filter owing to the heat of exhaust gas from the diesel engine or the heat of reaction of particulates, resulting in deteriorated activity of the catalyst, and hence there is a fear that sufficient combustion and removal of collected particulates in the exhaust gas may become impossible. In the case of the exhaust gas purifying filters in which the thickness of the coating layer of silica or zirconia was 1,000 $\mu$m, the pressure difference reached 300 mmHg in the early stage of about 10 minutes after the start of operation of the diesel engine (Example 93 and Example 101). From this fact, it became clear that when the thickness of the coating layer is more than 1,000 $\mu$m, the back pressure increases and tends to apply an excessive load to the diesel engine.

From the above results, it was proved that the thickness of the coating layer of silica or zirconia as an intermediate layer between the filter and catalyst layer of the exhaust gas purifying filter is preferably 1 $\mu$m to 1,000 $\mu$m, and that the coating prevents the diffusion of the components of the catalyst into the filter. Although lanthanum, strontium and cobalt were used as the components of the catalyst in Example 87 to Example 101, the same effect as above can be expected also when other metals are used as the components of the catalyst.

EXAMPLE 102

A filter of cordierite was impregnated with hydrofluoric acid having a concentration of 1% for 6 hours, dried in a dryer, impregnated with an aqueous solution of copper sulfate, vanadium sulfate and cesium sulfate as a mixed aqueous solution of salts of the components of a catalyst, freeze-dried, and then calcined in an electric furnace at 900° C. for 5 hours to produce an exhaust gas purifying filter. This filter is hereinafter referred to as the filter of Example 102.

EXAMPLE 103

A filter of cordierite was impregnated with a suspension of a mixed silica particles with particle diameters of 2 microns and 0.4 micron in distilled water to adhere silica particles to the filter in an amount of 5 wt % based on the weight of the filter, impregnated with an aqueous solution of copper sulfate, vanadium sulfate and cesium sulfate as a mixed aqueous solution of salts of the components of a catalyst, freeze-dried, and then calcined in an electric furnace at 900° C. for 5 hours to produce an exhaust gas purifying filter. This filter is hereinafter referred to as the filter of Example 103.

Evaluation Example 17

The exhaust gas purifying filters of Example 65, Example 102 and Example 103 were subjected to an exhaust gas purification test by the same method as in Evaluation Example 11.

The change of the pressure difference after the start of operation of the diesel engine is explained below with reference to FIG. 9 and FIG. 10.

Figure 9:
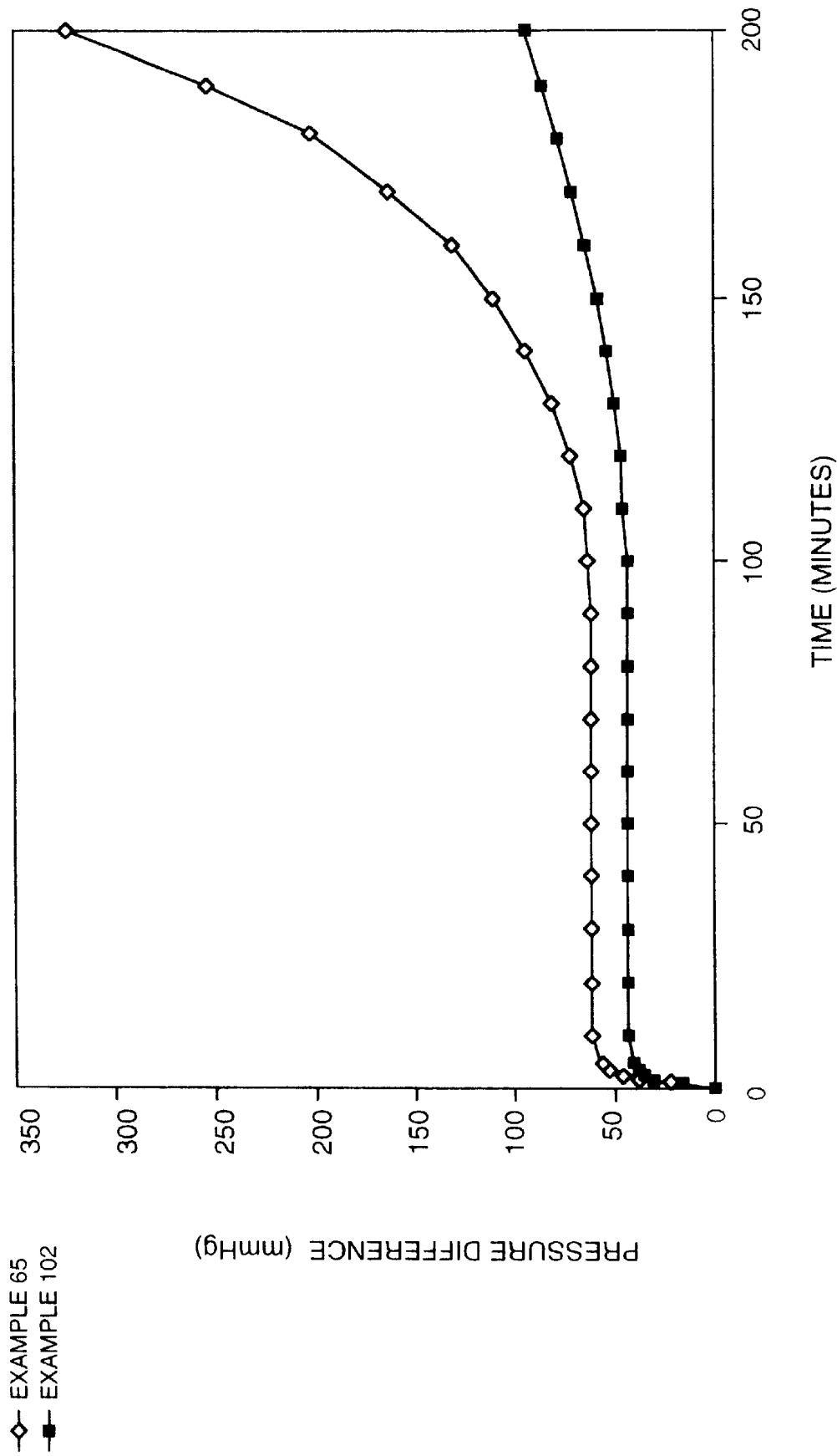
FIG. 9 is a graph showing the change with time of the difference between atmospheric pressure and exhaust gas pressure in each of the exhaust gas purifying filters of Example 65 and Example 102.
Figure 10:
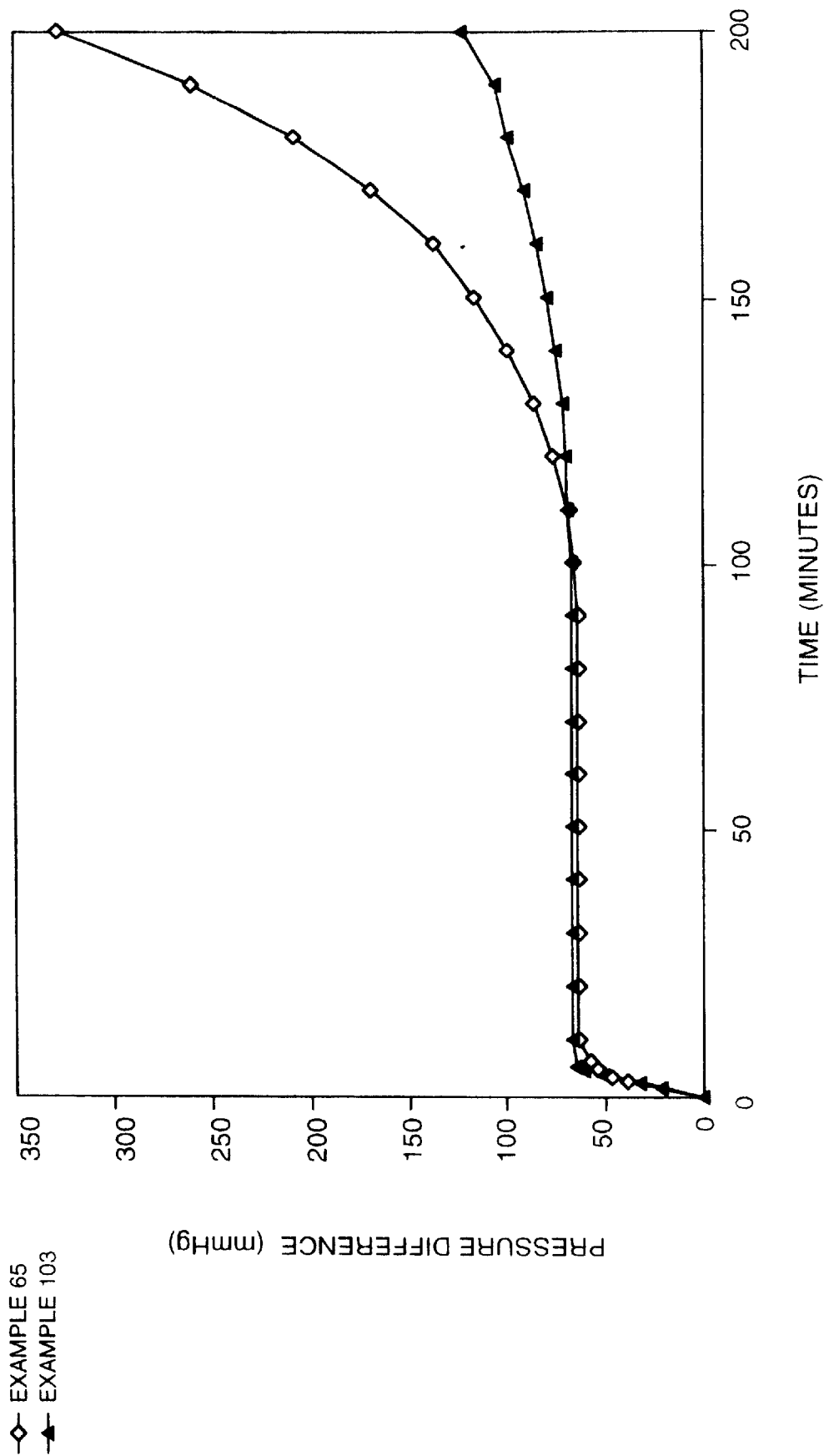
FIG. 10 is a graph showing the change with time of the difference between atmospheric pressure and exhaust gas pressure in each of the exhaust gas purifying filters of Example 65 and Example 103.

FIG. 9 is a graph showing the change with time of the difference between atmospheric pressure and exhaust gas pressure in each of the exhaust gas purifying filters of Example 65 and Example 102. FIG. 10 is a graph showing the change with time of the difference between atmospheric pressure and exhaust gas pressure in each of the exhaust gas purifying filters of Example 65 and Example 103. As shown in FIG. 9 and FIG. 10, when the filter had been neither treated with hydrofluoric acid nor coated with silica particles (Example 65), the pressure difference began to increase about 100 minutes after the start of operation of the diesel engine and then showed tendency to increase continuously. It can be seen that the increase of the pressure difference was suppressed when the filter had been previously treated with hydrofluoric acid (Example 102) or granular silica had been previously supported on the filter (Example 103). The reason for the suppression can be speculated as follows: the contact points between the catalyst and particulates in the exhaust gas was increased by the treatment of the filter with hydrofluoric acid or silica, so that the combustion rate was increased. Although hydrofluoric acid was used as an acid for treating the filter in Example 102, the same effect as above can be expected also when other acids are used. In addition, the same effect as above can be expected also when any other granular heat-resistant inorganic material is used in place of the granular silica supported on the filter.

EXAMPLE 104

A filter of cordierite was impregnated with hydrofluoric acid having a concentration of 1% for 6 hours, dried in a dryer, impregnated with an aqueous solution of lanthanum acetate, strontium acetate and cobalt acetate in a molar ratio of 0.9:0.1:1 as a mixed aqueous solution of salts of the components of a catalyst, freeze-dried, and then calcined in an electric furnace at 900° C. for 5 hours to produce an exhaust gas purifying filter supporting a catalyst $LaSrCoO_3$. This filter is hereinafter referred to as the filter of Example 104.

Evaluation Example 18

The exhaust gas purifying filters of Example 94 and Example 104 were subjected to an exhaust gas purification test by the same method as in Evaluation Example 11.

The change of the pressure difference after the start of operation of the diesel engine is explained below with reference to FIG. 11.

Figure 11:
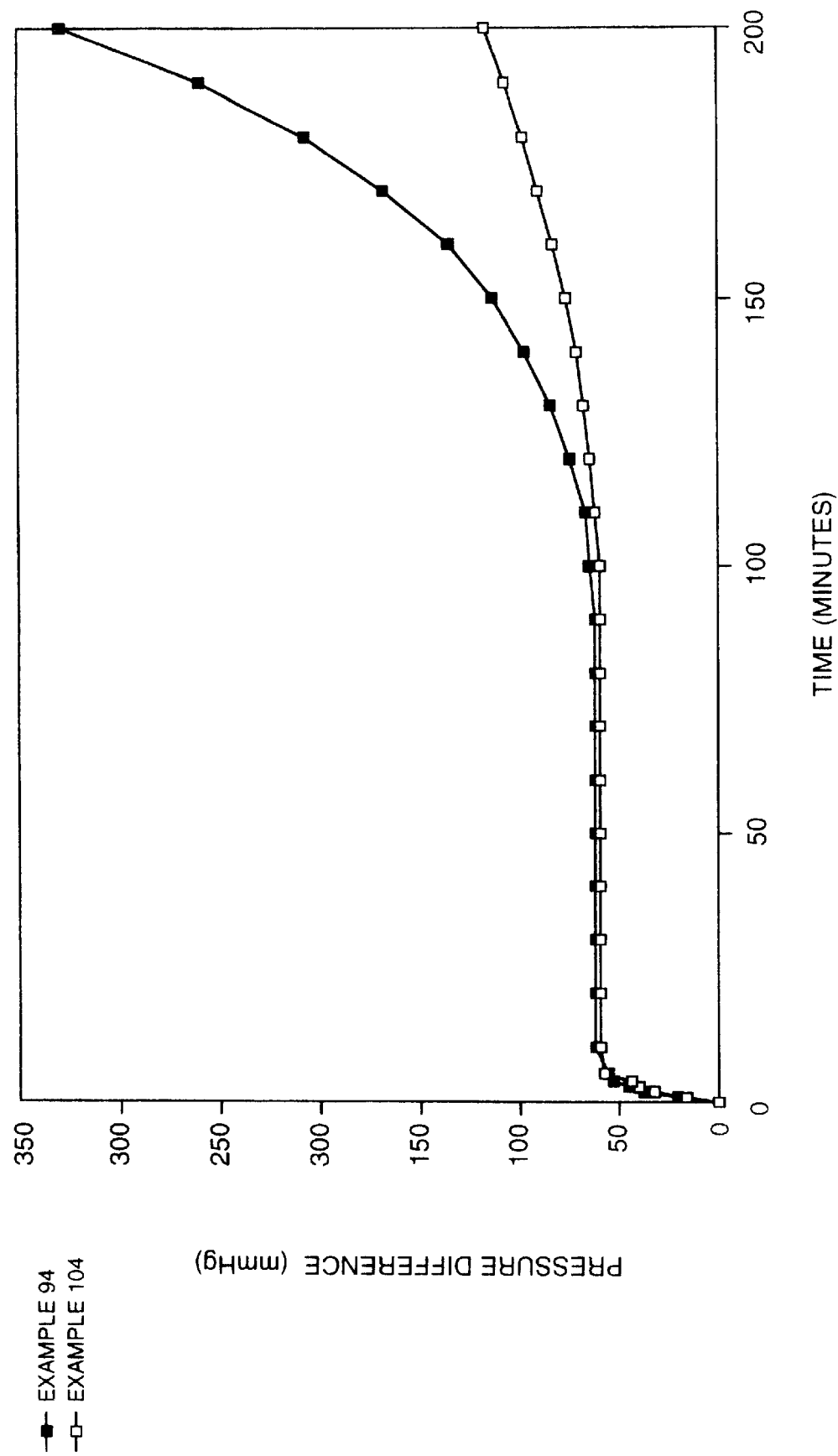
FIG. 11 is a graph showing the change with time of the difference between atmospheric pressure and exhaust gas pressure in each of the exhaust gas purifying filters of Example 94 and Example 104.

FIG. 11 is a graph showing the change with time of the difference between atmospheric pressure and exhaust gas pressure in each of the exhaust gas purifying filters of Example 94 and Example 104. As shown in FIG. 11, when the filter had not been treated with hydrofluoric acid (Example 94), the pressure difference began to increase about 100 minutes after the start of operation of the diesel engine and then showed tendency to increase continuously. It can be seen that the increase of the pressure difference was suppressed when the filter had previously been treated with hydrofluoric acid (Example 104). The reason for the suppression can be speculated as follows: the contact points between the catalyst and particulates in the exhaust gas was increased by the treatment of the filter with hydrofluoric acid, so that the combustion rate was increased. Although lanthanum, strontium and cobalt were used as the components of the catalyst in Example 104, the same effect as above can be expected also when other metals are used as the components of the catalyst.

EXAMPLE 105

Copper sulfate, vanadium oxide sulfate and lithium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Li_{0.05}O_{10-\alpha}$ wherein $\alpha$ denotes a value in the range $-0.04<\alpha<+0.1$ (hereinafter the same applied).

EXAMPLE 106

Copper sulfate, vanadium oxide sulfate and sodium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Na_{0.05}O_{10-\alpha}$.

EXAMPLE 107

Copper sulfate, vanadium oxide sulfate and potassium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2K_{0.05}O_{10-\alpha}$.

EXAMPLE 108

Copper sulfate, vanadium oxide sulfate and rubidium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Rb_{0.05}O_{10-\alpha}$.

EXAMPLE 109

Copper sulfate, vanadium oxide sulfate and cesium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Cs_{0.05}O_{10-\alpha}$.

EXAMPLE 110

Copper sulfate, vanadium oxide sulfate and beryllium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Be_{0.05}O_{10-\alpha}$.

EXAMPLE 111

Copper sulfate, vanadium oxide sulfate and magnesium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Mg_{0.05}O_{10-\alpha}$.

EXAMPLE 112

Copper sulfate, vanadium oxide sulfate and calcium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Ca_{0.05}O_{10-\alpha}$.

EXAMPLE 113

Copper sulfate, vanadium oxide sulfate and strontium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Sr_{0.05}O_{10-\alpha}$.

EXAMPLE 114

Copper sulfate, vanadium oxide sulfate and barium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Ba_{0.05}O_{10-\alpha}$.

EXAMPLE 115

Copper sulfate, vanadium oxide sulfate and scandium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Sc_{0.05}O_{10-\alpha}$.

EXAMPLE 116

Copper sulfate, vanadium oxide sulfate and titanium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Ti_{0.05}O_{10-\alpha}$.

EXAMPLE 117

Copper sulfate, vanadium oxide sulfate and chromium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Cr_{0.05}O_{10-\alpha}$.

EXAMPLE 118

Copper sulfate, vanadium oxide sulfate and manganese nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Mn_{0.05}O_{10-\alpha}$.

EXAMPLE 119

Copper sulfate, vanadium oxide sulfate and iron nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Fe_{0.05}O_{10-\alpha}$.

EXAMPLE 120

Copper sulfate, vanadium oxide sulfate and cobalt nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Co_{0.05}O_{10-\alpha}$.

EXAMPLE 121

Copper sulfate, vanadium oxide sulfate and nickel nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Ni_{0.05}O_{10-\alpha}$.

EXAMPLE 122

Copper sulfate, vanadium oxide sulfate and zinc nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Zn_{0.05}O_{10-\alpha}$.

EXAMPLE 123

Copper sulfate, vanadium oxide sulfate and gallium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Ga_{0.05}O_{10-\alpha}$.

EXAMPLE 124

Copper sulfate, vanadium oxide sulfate and germanium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Ge_{0.05}O_{10-\alpha}$.

EXAMPLE 125

Copper sulfate, vanadium oxide sulfate and zirconium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Zr_{0.05}O_{10-\alpha}$.

EXAMPLE 126

Copper sulfate, vanadium oxide sulfate and niobium nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Nb_{0.05}O_{10-\alpha}$.

EXAMPLE 127

Copper sulfate, vanadium oxide sulfate and molybdenum nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Mo_{0.05}O_{10-\alpha}$.

EXAMPLE 128

Copper sulfate, vanadium oxide sulfate and tantalum nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2Ta_{0.05}O_{10-\alpha}$.

EXAMPLE 129

Copper sulfate, vanadium oxide sulfate and tungsten nitrate were dissolved in a molar ratio of 4.95:2:0.05 in water, and the resulting solution was evaporated to dryness and then heat-treated in an electric furnace at 900° C. for 5 hours to prepare a complex metal oxide having a theoretical composition $Cu_{4.95}V_2W_{0.05}O_{10-\alpha}$.

Evaluation Example 19

The catalysts for exhaust gas purification of Example 105 to Example 129 were subjected to a combustion experiment by the same method as in Evaluation Example 1.

Table 11 shows the 10% combustion temperatures of the catalysts of Example 105 to Example 129 together with that of catalyst for exhaust gas purification of Experiment 5.

It was found that as shown in Table 11, the replacement of a part of Cu of a complex metal oxide by another metal results in a lowered 10% combustion temperature, i.e., an improved activity. Although the complex metal oxide was $Cu_5V_2O_{10}$ in Example 105 to Example 129, the same effect as above can be expected also in other Cu—V complex metal oxides. Further, powder of the complex metal oxide of Example 105 was suspended in an aqueous cesium sulfate solution so that the molar ratio of $Cs_2SO_4$ to the complex metal oxide of Example 105 was set to at 1:1. The resulting suspension was evaporated to dryness and then heat-treated in an electric furnace at 900° C. for 5 hours to obtain a catalyst for exhaust gas purification. A 10% combustion temperature of the catalyst was 352° C. and lower than the 10% combustion temperature of the catalyst of Example 28. Thus, it was found that the addition of cesium sulfate further improves the catalytic activity. The same effect as above can be expected also in the complex metal oxides of Example 106 to Example 129 and in other Cu—V complex metal oxide.

EXAMPLE 130

Copper sulfate, vanadium oxide sulfate and lithium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Li_{0.02}O_{10-\alpha}$.

EXAMPLE 131

Copper sulfate, vanadium oxide sulfate and sodium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Na_{0.02}O_{10-\alpha}$.

EXAMPLE 132

Copper sulfate, vanadium oxide sulfate and potassium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}K_{0.02}O_{10-\alpha}$.

EXAMPLE 133

Copper sulfate, vanadium oxide sulfate and rubidium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Rb_{0.02}O_{10-\alpha}$.

EXAMPLE 134

Copper sulfate, vanadium oxide sulfate and cesium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Cs_{0.02}O_{10-\alpha}$.

EXAMPLE 135

Copper sulfate, vanadium oxide sulfate and beryllium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Be_{0.02}O_{10-\alpha}$.

EXAMPLE 136

Copper sulfate, vanadium oxide sulfate and magnesium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Mg_{0.02}O_{10-\alpha}$.

EXAMPLE 137

Copper sulfate, vanadium oxide sulfate and calcium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Ca_{0.02}O_{10-\alpha}$.

EXAMPLE 138

Copper sulfate, vanadium oxide sulfate and strontium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Sr_{0.02}O_{10-\alpha}$.

EXAMPLE 139

Copper sulfate, vanadium oxide sulfate and barium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Ba_{0.02}O_{10-\alpha}$.

EXAMPLE 140

Copper sulfate, vanadium oxide sulfate and scandium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Sc_{0.02}O_{10-\alpha}$.

EXAMPLE 141

Copper sulfate, vanadium oxide sulfate and titanium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Ti_{0.02}O_{10-\alpha}$.

EXAMPLE 142

Copper sulfate, vanadium oxide sulfate and chromium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Cr_{0.02}O_{10-\alpha}$.

EXAMPLE 143

Copper sulfate, vanadium oxide sulfate and manganese nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Mn_{0.02}O_{10-\alpha}$.

EXAMPLE 144

Copper sulfate, vanadium oxide sulfate and iron nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Fe_{0.02}O_{10-\alpha}$.

EXAMPLE 145

Copper sulfate, vanadium oxide sulfate and cobalt nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Co_{0.02}O_{10-\alpha}$.

EXAMPLE 146

Copper sulfate, vanadium oxide sulfate and nickel nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Ni_{0.02}O_{10-\alpha}$.

EXAMPLE 147

Copper sulfate, vanadium oxide sulfate and zinc nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Zn_{0.02}O_{10-\alpha}$.

EXAMPLE 148

Copper sulfate, vanadium oxide sulfate and gallium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Ga_{0.02}O_{10-\alpha}$.

EXAMPLE 149

Copper sulfate, vanadium oxide sulfate and germanium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Ge_{0.02}O_{10-\alpha}$.

EXAMPLE 150

Copper sulfate, vanadium oxide sulfate and zirconium nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Zr_{0.02}O_{10-\alpha}$.

EXAMPLE 151

Copper sulfate, vanadium oxide sulfate and niobium nitrate were dissolved in a molar ratio of 5:1.98:0.02 in water, and the resulting solution was evaporated to dryness and then heat-treated in an electric furnace at 9000° C. for 5 hours to prepare a complex metal oxide having a theoretical composition $Cu_5V_{1.98}Nb_{0.02}O_{10-\alpha}$.

EXAMPLE 152

Copper sulfate, vanadium oxide sulfate and molybdenum nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Mo_{0.02}O_{10-\alpha}$.

EXAMPLE 153

Copper sulfate, vanadium oxide sulfate and tantalum nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}Ta_{0.02}O_{10-\alpha}$.

EXAMPLE 154

Copper sulfate, vanadium oxide sulfate and tungsten nitrate were dissolved in a molar ratio of 5:1.98:0.02 in water, and the resulting solution was evaporated to dryness and then heat-treated in an electric furnace at 900° C. for 5 hours to prepare a complex metal oxide having a theoretical composition $Cu_5V_{1.98}W_{0.02}O_{10-\alpha}$.

Evaluation Example 20

The catalysts for exhaust gas purification of Example 130 to Example 154 were subjected to a combustion experiment by the same method as in Evaluation Example 1.

Table 12 shows the 10% combustion temperatures of the catalysts of Example 130 to Example 154 together with that of catalyst for exhaust gas purification of Experiment 5.

It was found that as shown in Table 12, the replacement of a part of V of a complex metal oxide by another metal results in a lowered 10% combustion temperature, i.e., an improved activity. Although the complex metal oxide was $Cu_5V_2O_{10}$ in Example 130 to Example 154, the same effect as above can be expected also in other Cu—V complex metal oxides. Further, powder of the complex metal oxide of Example 130 suspended in an aqueous cesium sulfate solution so that the molar ratio of $Cs_2SO_4$ to the complex metal oxide of Example 130 was set to at 1:1. The resulting suspension was evaporated to dryness and then heat-treated in an electric furnace at 900° C. for 5 hours to obtain a catalyst for exhaust gas purification. A 10% combustion temperature of the catalyst was 350° C. and lower than the 10% combustion temperature of the catalyst of Example 28. Thus, it was found that the addition of cesium sulfate further improves the catalytic activity. The same effect as above can be expected also in the complex metal oxides of Example 131 to Example 154 and in other Cu—V complex metal oxide.

EXAMPLE 155

Copper sulfate, ammonium molybdate and lithium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Li_{0.01}O_{4-\alpha}$.

EXAMPLE 156

Copper sulfate, ammonium molybdate and sodium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Na_{0.01}O_{4-\alpha}$.

EXAMPLE 157

Copper sulfate, ammonium molybdate and potassium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}K_{0.01}O_{4-\alpha}$.

EXAMPLE 158

Copper sulfate, ammonium molybdate and rubidium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Rb_{0.01}O_{4-\alpha}$.

EXAMPLE 159

Copper sulfate, ammonium molybdate and cesium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Cs_{0.01}O_{4-\alpha}$.

EXAMPLE 160

Copper sulfate, ammonium molybdate and beryllium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Be_{0.01}O_{4-\alpha}$.

EXAMPLE 161

Copper sulfate, ammonium molybdate and magnesium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Mg_{0.01}O_{4-\alpha}$.

EXAMPLE 162

Copper sulfate, ammonium molybdate and calcium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Ca_{0.01}O_{4-\alpha}$.

EXAMPLE 163

Copper sulfate, ammonium molybdate and strontium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Sr_{0.01}O_{4-\alpha}$.

EXAMPLE 164

Copper sulfate, ammonium molybdate and barium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Ba_{0.01}O_{4-\alpha}$.

EXAMPLE 165

Copper sulfate, ammonium molybdate and scandium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Sc_{0.01}O_{4-\alpha}$.

EXAMPLE 166

Copper sulfate, ammonium molybdate and titanium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Ti_{0.01}O_{4-\alpha}$.

EXAMPLE 167

Copper sulfate, ammonium molybdate and vanadium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}V_{0.01}O_{4-\alpha}$.

EXAMPLE 168

Copper sulfate, ammonium molybdate and chromium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Cr_{0.01}O_{4-\alpha}$.

EXAMPLE 169

Copper sulfate, ammonium molybdate and manganese nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Mn_{0.01}O_{4-\alpha}$.

EXAMPLE 170

Copper sulfate, ammonium molybdate and iron nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Fe_{0.01}O_{4-\alpha}$.

EXAMPLE 171

Copper sulfate, ammonium molybdate and cobalt nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Co_{0.01}O_{4-\alpha}$.

EXAMPLE 172

Copper sulfate, ammonium molybdate and nickel nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Ni_{0.01}O_{4-\alpha}$.

EXAMPLE 173

Copper sulfate, ammonium molybdate and copper nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Cu_{0.01}O_{4-\alpha}$.

EXAMPLE 174

Copper sulfate, ammonium molybdate and zinc nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Zn_{0.01}O_{4-\alpha}$.

EXAMPLE 175

Copper sulfate, ammonium molybdate and gallium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Ga_{0.01}O_{4-\alpha}$.

EXAMPLE 176

Copper sulfate, ammonium molybdate and germanium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Ge_{0.01}O_{4-\alpha}$.

EXAMPLE 177

Copper sulfate, ammonium molybdate and zirconium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Zr_{0.01}O_{4-\alpha}$.

EXAMPLE 178

Copper sulfate, ammonium molybdate and niobium nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuMo_{0.99}Nb_{0.01}O_{4-\alpha}$.

EXAMPLE 179

Copper sulfate, ammonium molybdate and tantalum nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuM_{0.99}Ta_{0.01}O_{4-\alpha}$.

EXAMPLE 180

Copper sulfate, ammonium molybdate and tungsten nitrate were dissolved in a molar ratio of 1:0.99:0.01 in water, and the resulting solution was evaporated to dryness and then heat-treated in an electric furnace at 900° C. for 5 hours to prepare a complex metal oxide having a theoretical composition $CuM_{0.99}W_{0.01}O_{4-\alpha}$.

Evaluation Example 21

The catalysts for exhaust gas purification of Example 155 to Example 180 were subjected to a combustion experiment by the same method as in Evaluation Example 1.

Table 13 shows the 10% combustion temperatures of the catalysts of Example 155 to Example 180 together with that of catalyst for exhaust gas purification of Experiment 10.

It was found that as shown in Table 13, the replacement of a part of Mo of a complex metal oxide by another metal results in a lowered 10% combustion temperature, i.e., an improved activity. Although the complex metal oxide was $Cu_5MoO_4$ in Example 155 to Example 180, the same effect as above can be expected also in other Cu—Mo complex metal oxides. Further, powder of the complex metal oxide of Example 155 was suspended in an aqueous cesium sulfate solution so that the molar ratio of $Cs_2SO_4$ to the complex metal oxide of Example 155 was set to at 1:1. The resulting suspension was evaporated to dryness and then heat-treated in an electric furnace at 900° C. for 5 hours to obtain a catalyst for exhaust gas purification. A 10% combustion temperature of the catalyst was 350° C. and lower than the 10% combustion temperature of the catalyst of Example 29. Thus, it was found that the addition of cesium sulfate further improves the catalytic activity. The same effect as above can be expected also in the complex metal oxides of Example 156 to Example 180 and in other Cu—Mo complex metal oxide.

EXAMPLE 181

Copper sulfate, vanadium oxide sulfate and lithium nitrate were dissolved in a molar ratio of 4.9995:2:0.0005 in water, and the resulting solution was evaporated to dryness and then heat-treated in an electric furnace at 900° C. for 5 hours to prepare a complex metal oxide having a theoretical composition $Cu_{4.9995}V_2Li_{0.0005}O_{10-\alpha}$.

EXAMPLE 182

Copper sulfate, vanadium oxide sulfate and lithium nitrate were dissolved in a molar ratio of 4.995:2:0.005 in water, and the resulting solution was evaporated to dryness and then heat-treated in an electric furnace at 900° C. for 5 hours to prepare a complex metal oxide having a theoretical composition $Cu_{4.995}V_2Li_{0.005}O_{10-\alpha}$.

EXAMPLE 183

Copper sulfate, vanadium oxide sulfate and lithium nitrate were dissolved in a molar ratio of 3.5:2:1.5 in water, and the resulting solution was evaporated to dryness and then heat-treated in an electric furnace at 900° C. for 5 hours to prepare a complex metal oxide having a theoretical composition $Cu_{3.5}V_2Li_{1.5}O_{10-\alpha}$.

EXAMPLE 184

Copper sulfate, vanadium oxide sulfate and lithium nitrate were dissolved in a molar ratio of 2.5:2:2.5 in water, and the resulting solution was evaporated to dryness and then heat-treated in an electric furnace at 900° C. for 5 hours to prepare a complex metal oxide having a theoretical composition $Cu_{2.5}V_2Li_{2.5}O_{10-\alpha}$.

EXAMPLE 185

Copper sulfate, vanadium oxide sulfate and lithium nitrate were dissolved in a molar ratio of 2:2:3 in water, and the resulting solution was evaporated to dryness and then heat-treated in an electric furnace at 900° C. for 5 hours to prepare a complex metal oxide having a theoretical composition $Cu_2V_2Li_3O_{10-\alpha}$.

Evaluation Example 22

The catalysts for exhaust gas purification of Example 181 to Example 185 were subjected to a combustion experiment by the same method as in Evaluation Example 1.

Table 14 shows the 10% combustion temperatures of the catalysts of Example 181 to Example 185 together with those of the catalysts of Experiment 5 and Example 105.

As shown in Table 14, when the percentage of replacement of Cu of a complex metal oxide by Li is less than 0.1%, no effect of the control of the valences is obtained. When the percentage is more than 30%, the structure itself of the metal oxide is changed, resulting in a deteriorated activity. When the percentage is less than 0.01%, or more than 50%, there is a marked tendency of the above. Although Li was used as a substituent metal in Example 181 to Example 185, the same effect of the control of the valences as above can be expected also when other substituent metals are used.

EXAMPLE 186

Copper sulfate, vanadium oxide sulfate and lithium nitrate were dissolved in a molar ratio of 5:1.9998:0.0002 in water, and the resulting solution was evaporated to dryness and then heat-treated in an electric furnace at 900° C. for 5 hours to prepare a complex metal oxide having a theoretical composition $Cu_5V_{1.9998}Li_{0.0002}O_{10-\alpha}$.

EXAMPLE 187

Copper sulfate, vanadium oxide sulfate and lithium nitrate were dissolved in a molar ratio of 5:1.998:0.002 in water, and the resulting solution was evaporated to dryness and then heat-treated in an electric furnace at 900° C. for 5 hours to prepare a complex metal oxide having a theoretical composition $Cu_5V_{1.998}Li_{0.002}O_{10-\alpha}$.

EXAMPLE 188

Copper sulfate, vanadium oxide sulfate and lithium nitrate were dissolved in a molar ratio of 5:1.4:0.6 in water, and the resulting solution was evaporated to dryness and then heat-treated in an electric furnace at 900° C. for 5 hours to prepare a complex metal oxide having a theoretical composition $Cu_5V_{1.4}Li_{0.6}O_{10-\alpha}$.

EXAMPLE 189

Copper sulfate, vanadium oxide sulfate and lithium nitrate were dissolved in a molar ratio of 5:1:1 in water, and the resulting solution was evaporated to dryness and then heat-treated in an electric furnace at 900° C. for 5 hours to prepare a complex metal oxide having a theoretical composition $Cu_5V_1Li_1O_{10-\alpha}$.

EXAMPLE 190

Copper sulfate, vanadium oxide sulfate and lithium nitrate were dissolved in a molar ratio of 5:0.8:1.2 in water, and the resulting solution was evaporated to dryness and then heat-treated in an electric furnace at 900° C. for 5 hours to prepare a complex metal oxide having a theoretical composition $Cu_5V_{0.8}Li_{1.2}O_{10-\alpha}$.

Evaluation Example 23

The catalysts for exhaust gas purification of Example 186 to Example 190 were subjected to a combustion experiment by the same method as in Evaluation Example 1.

Table 15 shows the 10% combustion temperatures of the catalysts of Example 186 to Example 190 together with those of the catalysts of Experiment 5 and Example 130.

As shown in Table 15, when the percentage of replacement of V of a complex metal oxide by Li is less than 0.1%, no effect of the control of the valences is obtained. When the percentage is more than 30%, the structure itself of the metal oxide is changed, resulting in a deteriorated activity. When the percentage is less than 0.01%, or more than 50%, there is a marked tendency of the above. Although Li was used as a substituent metal in Example 186 to Example 190, the same effect of the control of the valences as above can be expected also when other substituent metals are used.

EXAMPLE 191

Copper sulfate, ammonium molybdate and lithium nitrate were dissolved in a molar ratio of 1:0.9999:0.0001 in water, and the resulting solution was evaporated to dryness and then heat-treated in an electric furnace at 900° C. for 5 hours to prepare a complex metal oxide having a theoretical composition $CuMo_{0.9999}Li_{0.0001}O_{4-\alpha}$.

EXAMPLE 192

Copper sulfate, ammonium molybdate and lithium nitrate were dissolved in a molar ratio of 1:0.999:0.001 in water, and the resulting solution was evaporated to dryness and then heat-treated in an electric furnace at 900° C. for 5 hours to prepare a complex metal oxide having a theoretical composition $CuMo_{0.999}Li_{0.001}O_{4-\alpha}$.

EXAMPLE 193

Copper sulfate, ammonium molybdate and lithium nitrate were dissolved in a molar ratio of 1:0.7:0.3 in water, and the resulting solution was evaporated to dryness and then heat-treated in an electric furnace at 900° C. for 5 hours to prepare a complex metal oxide having a theoretical composition $CuMo_{0.7}Li_{0.3}O_{4-\alpha}$.

EXAMPLE 194

Copper sulfate, ammonium molybdate and lithium nitrate were dissolved in a molar ratio of 1:0.5:0.5 in water, and the resulting solution was evaporated to dryness and then heat-treated in an electric furnace at 900° C. for 5 hours to prepare a complex metal oxide having a theoretical composition $CuMo_{0.5}Li_{0.5}O_{4-\alpha}$.

EXAMPLE 195

Copper sulfate, ammonium molybdate and lithium nitrate were dissolved in a molar ratio of 1:0.4:0.6 in water, and the resulting solution was evaporated to dryness and then heat-treated in an electric furnace at 900° C. for 5 hours to prepare a complex metal oxide having a theoretical composition $CuMo_{0.4}Li_{0.6}O_{4-\alpha}$.

Evaluation Example 24

The catalysts for exhaust gas purification of Example 191 to Example 195 were subjected to a combustion experiment by the same method as in Evaluation Example 1.

Table 16 shows the 10% combustion temperatures of the catalysts of Example 191 to Example 195 together with those of the catalysts of Experiment Example 10 and Example 155.

As shown in Table 16, when the percentage of replacement of Mo of a complex metal oxide by Li is less than 0.1%, no effect of the control of the valences is obtained. When the percentage is more than 30%, the structure itself of the metal oxide is changed, resulting in a deteriorated activity. When the percentage is less than 0.01%, or more than 50%, there is a marked tendency of the above. Although Li was used as a substituent metal in Example 191 to Example 195, the same effect of the control of the valences as above can be expected also when other substituent metals are used.

EXAMPLE 196

Copper oxide powder was suspended in an aqueous solution of cesium sulfate and lithium sulfate so that the molar ratio among cesium sulfate, lithium sulfate and copper oxide was set at 65:35:100 (Cs:Li:Cu). The resulting suspension was evaporated to dryness and then heat-treated in an electric furnace at 900° C. for 5 hours to obtain a catalyst for exhaust gas purification.

EXAMPLE 197

Copper oxide powder was suspended in an aqueous solution of cesium sulfate and sodium sulfate so that the molar ratio among cesium sulfate, sodium sulfate and copper oxide was set at 65:35:100 (Cs:Na:Cu). The resulting suspension was evaporated to dryness and then heat-treated in an electric furnace at 900° C. for 5 hours to obtain a catalyst for exhaust gas purification.

EXAMPLE 198

Copper oxide powder was suspended in an aqueous solution of cesium sulfate and potassium sulfate so that the molar ratio among cesium sulfate, potassium sulfate and copper oxide was set at 65:35:100 (Cs:K:Cu). The resulting suspension was evaporated to dryness and then heat-treated in an electric furnace at 900° C. for 5 hours to obtain a catalyst for exhaust gas purification.

EXAMPLE 199

Copper oxide powder was suspended in an aqueous solution of cesium sulfate and rubidium sulfate so that the molar ratio among cesium sulfate, rubidium sulfate and copper oxide was set at 65:35:100 (Cs:Rb:Cu). The resulting suspension was evaporated to dryness and then heat-treated in an electric furnace at 900° C. for 5 hours to obtain a catalyst for exhaust gas purification.

EXAMPLE 200

Copper oxide powder was suspended in an aqueous solution of cesium sulfate and beryllium sulfate so that the molar ratio among cesium sulfate, beryllium sulfate and copper oxide was set at 65:35:100 (Cs:Be:Cu). The resulting suspension was evaporated to dryness and then heat-treated in an electric furnace at 900° C. for 5 hours to obtain a catalyst for exhaust gas purification.

EXAMPLE 201

Copper oxide powder was suspended in an aqueous solution of cesium sulfate and magnesium sulfate so that the molar ratio among cesium sulfate, magnesium sulfate and copper oxide was set at 65:35:100 (Cs:Mg:Cu). The resulting suspension was evaporated to dryness and then heat-treated in an electric furnace at 900° C. for 5 hours to obtain a catalyst for exhaust gas purification.

EXAMPLE 202

Copper oxide powder was suspended in an aqueous solution of cesium sulfate and calcium sulfate so that the molar ratio among cesium sulfate, calcium sulfate and copper oxide was set at 65:35:100 (Cs:Ca:Cu). The resulting suspension was evaporated to dryness and then heat-treated in an electric furnace at 900° C. for 5 hours to obtain a catalyst for exhaust gas purification.

EXAMPLE 203

Copper oxide powder was suspended in an aqueous solution of cesium sulfate and strontium sulfate so that the molar ratio among cesium sulfate, strontium sulfate and copper oxide was set at 65:35:100 (Cs:Sr:Cu). The resulting suspension was evaporated to dryness and then heat-treated in an electric furnace at 900° C. for 5 hours to obtain a catalyst for exhaust gas purification.

EXAMPLE 204

Copper oxide powder was suspended in an aqueous solution of cesium sulfate and barium sulfate so that the molar ratio among cesium sulfate, barium sulfate and copper oxide was set at 65:35:100 (Cs:Ba:Cu). The resulting suspension was evaporated to dryness and then heat-treated in an electric furnace at 900° C. for 5 hours to obtain a catalyst for exhaust gas purification.

Evaluation Example 25

The catalysts for exhaust gas purification of Example 196 to Example 204 were subjected to a combustion experiment by the same method as in Evaluation Example 1.

Table 17 shows the 10% combustion temperatures of the catalysts of Example 196 to Example 204 together with that of the catalyst of Example 1.

As shown in Table 17, the addition of cesium sulfate and an alkali metal sulfate or an alkaline earth metal sulfate to copper oxide improves the activity more markedly than the addition of only cesium sulfate to copper oxide. In particular, it was found that the improvement of the activity is especially remarkable when cesium sulfate and potassium sulfate are added. Although copper oxide was used as a metal oxide in Example 196 to Example 204, the same effect as above can be expected also when other metal oxides are used.

EXAMPLE 205

Copper oxide powder was suspended in an aqueous solution of cesium sulfate and potassium sulfate so that the molar ratio among cesium sulfate, potassium sulfate and copper oxide might be 90:10:100 (Cs:K:Cu). The resulting suspension was evaporated to dryness and then heat-treated in an electric furnace at 900° C. for 5 hours to obtain a catalyst for exhaust gas purification.

EXAMPLE 206

Copper oxide powder was suspended in an aqueous solution of cesium sulfate and potassium sulfate so that the molar ratio among cesium sulfate, potassium sulfate and copper oxide might be 80:20:100 (Cs:K:Cu). The resulting suspension was evaporated to dryness and then heat-treated in an electric furnace at 900° C. for 5 hours to obtain a catalyst for exhaust gas purification.

EXAMPLE 207

Copper oxide powder was suspended in an aqueous solution of cesium sulfate and potassium sulfate so that the molar ratio among cesium sulfate, potassium sulfate and copper oxide might be 40:60:100 (Cs:K:Cu). The resulting suspension was evaporated to dryness and then heat-treated in an electric furnace at 9000° C. for 5 hours to obtain a catalyst for exhaust gas purification.

EXAMPLE 208

Copper oxide powder was suspended in an aqueous solution of cesium sulfate and potassium sulfate so that the molar ratio among cesium sulfate, potassium sulfate and copper oxide might be 30:70:100 (Cs:K:Cu). The resulting suspension was evaporated to dryness and then heat-treated in an electric furnace at 900° C. for 5 hours to obtain a catalyst for exhaust gas purification.

Evaluation Example 26

The catalysts for exhaust gas purification of Example 205 to Example 208 were subjected to a combustion experiment by the same method as in Evaluation Example 1.

Table 18 shows the 10% combustion temperatures of the catalysts of Example 205 to Example 208 together with those of the catalysts of Example 1, Example 4 and Example 198.

As shown in Table 18, when cesium sulfate and potassium sulfate are added to copper oxide, the melting point is not lowered at a molar ratio of cesium sulfate to potassium sulfate of more than 8:2, or less than 4:6. When the molar ratio is more than 9:1, or less than 3:7, there is a marked tendency of the above.

As described above, the catalyst for exhaust gas purification of the present invention is very effective in that since it is provided as a catalyst for exhaust gas purification having a high catalytic activity for the combustion of particulates and having excellent heat resistance and toxin resistance against sulfur oxides, it permits combustion and removal of the particulates in exhaust gas at a low temperature close to the exhaust gas temperature and moreover can retain a high catalytic activity over a long period of time.

The process for producing a catalyst for exhaust gas purification of the present invention is very effective in that it permits easy and sufficiently high-volume production of a catalyst for exhaust gas purification having a high catalytic activity for the combustion of particulates and having excellent heat resistance and toxin resistance against sulfur oxides, and hence permits mass production of the catalyst for exhaust gas purification having excellent catalytic action and durability, at low cost.

The exhaust gas purifying filter of the present invention is very effective in that it can be provided as an exhaust gas purifying filter having a high exhaust gas purification rate and an excellent durability.

The exhaust gas purifying apparatus of the present invention is very effective in that it can be provided as an exhaust gas purifying apparatus having a simple structure and excellent exhaust gas purifying properties.

In addition, the exhaust gas purifying filter of the present invention is effective in that the components of the catalyst supported on the filter are inhibited from diffusing into the filter owing to heat to deteriorate the catalytic activity.

Furthermore, the exhaust gas purifying filter of the present invention is effective in that since the contact points of the catalyst supported on the filter with the components of exhaust gas to be removed can be increased, the rate of combustion and removal of these components can be increased.

TABLE 1

|  | Composition of catalyst | Compositional ratio (molar ratio) | Temp. at 10% combustion |
|---|---|---|---|
| Example 1 | Copper oxide + cesium sulfate | 1:1 | 398° C. |
| Example 2 | Copper oxide + Lithium sulfate | 1:1 | 410° C. |
| Example 3 | Copper oxide + Sodium sulfate | 1:1 | 408° C. |
| Example 4 | Copper oxide + Potasium sulfate | 1:1 | 407° C. |
| Example 5 | Copper oxide + Rubidium sulfate | 1:1 | 400° C. |
| Example 6 | Copper oxide + Beryllium sulfate | 1:1 | 400° C. |
| Example 7 | Copper oxide + Magnesium sulfate | 1:1 | 400° C. |
| Example 8 | Copper oxide + Calcium sulfate | 1:1 | 410° C. |
| Example 9 | Copper oxide + Strontium sulfate | 1:1 | 412° C. |
| Example 10 | Copper oxide + Barium sulfate | 1:1 | 414° C. |
| Comparative Example 1 | Copper oxide | 1:1 | 495° C. |

TABLE 2

|  | Composition of catalyst | Compositional ratio (molar ratio) | Temp. at 10% combustion |
|---|---|---|---|
| Example 1 | Copper oxide + Cesium sulfate | 1:1 | 398° C. |
| Example 11 | Copper oxide + Cesium sulfate + Pt | 1:1:1/15 | 382° C. |

TABLE 3

|  | Composition of catalyst | Compositional ratio (molar ratio) | Temp. at 10% combustion |
|---|---|---|---|
| Example 1 | Copper oxide + Cesium sulfate | 1:1 | 398° C. |
| Comparative Example 2 | Copper oxide + Cesium acetate | 1:1 | 440° C. |
| Comparative Example 3 | Copper oxide + Cesium nitrate | 1:1 | 450° C. |
| Comparative Example 4 | Copper oxide + Cesium carbonate | 1:1 | 430° C. |

TABLE 4

|  | Composition of catalyst | Compositional ratio (molar ratio) | Temp. at 10% combustion |
|---|---|---|---|
| Example 12 | Vanadium oxide + Cesium sulfate | 1:1 | 401° C. |
| Comparative Example 5 | Vanadium oxide |  | 450° C. |
| Example 13 | Niobium oxide + Cesium sulfate | 1:1 | 480° C. |
| Comparative Example 6 | Niobium oxide |  | 512° C. |
| Example 14 | Tantalum oxide + Cesium sulfate | 1:1 | 472° C. |
| Comparative Example 7 | Tantalum oxide |  | 510° C. |
| Example 15 | Chromium oxide + Cesium sulfate | 1:1 | 432° C. |
| Comparative Example 8 | Chromium oxide |  | 485° C. |
| Example 16 | Molybdenum oxide + Cesium sulfate | 1:1 | 398° C. |
| Comparative Example 9 | Molybdenum oxide |  | 450° C. |
| Example 17 | Tungsten oxide + Cesium sulfate | 1:1 | 442° C. |
| Comparative Example 10 | Tungsten oxide |  | 490° C. |
| Example 18 | Manganese oxide + Cesium sulfate | 1:1 | 440° C. |
| Comparative Example 11 | Manganese oxide |  | 498° C. |
| Example 19 | Iron oxide + Cesium sulfate | 1:1 | 449° C. |
| Comparative Example 12 | Iron oxide |  | 498° C. |
| Example 20 | Cobalt oxide + Cesium sulfate | 1:1 | 430° C. |
| Comparative Example 13 | Cobalt oxide |  | 488° C. |
| Example 21 | Nickel oxide + Cesium sulfate | 1:1 | 444° C. |
| Comparative Example 14 | Nickel oxide |  | 498° C. |
| Example 22 | Zinc oxide + Cesium sulfate | 1:1 | 452° C. |

TABLE 4-continued

| | Composition of catalyst | Compositional ratio (molar ratio) | Temp. at 10% combustion |
|---|---|---|---|
| Comparative Example 15 | Zinc oxide | | 501° C. |
| Example 23 | Gallium oxide + Cesium sulfate | 1:1 | 443° C. |
| Comparative Example 16 | Gallium oxide | | 502° C. |
| Example 24 | Tin oxide + Cesium sulfate | 1:1 | 438° C. |
| Comparative Example 17 | Tin oxide | | 488° C. |
| Example 25 | Lead oxide + Cesium sulfate | 1:1 | 448° C. |
| Comparative Example 18 | Lead oxide | | 495° C. |

TABLE 5

| | Compositional ratio (atomic ratio Cu:V) | Temp. at 10% combustion |
|---|---|---|
| Experiment 1 | 1:5 | 490° C. |
| Experiment 2 | 1:2 | 484° C. |
| Experiment 3 | 1:1 | 417° C. |
| Experiment 4 | 3:2 | 379° C. |
| Experiment 5 | 5:2 | 397° C. |
| Experiment 6 | 4:1 | 430° C. |
| Experiment 7 | 5:1 | 461° C. |

TABLE 6

| | Composition of catalyst | Compositional ratio (molar ratio) | Temp. at 10% combustion |
|---|---|---|---|
| Example 26 | $CuVO_3$ + Cesium sulfate | 1:1 | 360° C. |
| Example 27 | $Cu_3V_2O_8$ + Cesium sulfate | 1:1 | 375° C. |
| Example 28 | $Cu_5V_2O_{10}$ + Cesium sulfate | 1:1 | 366° C. |

TABLE 7

| | Compositional ratio (atomic ratio Cu:Mo) | Temp. at 10% combustion |
|---|---|---|
| Example 8 | 1:5 | 492° C. |
| Example 9 | 1:2 | 486° C. |
| Example 10 | 1:1 | 416° C. |
| Example 11 | 3:2 | 378° C. |
| Example 12 | 5:2 | 395° C. |
| Example 13 | 4:1 | 432° C. |
| Example 14 | 5:1 | 465° C. |

TABLE 8

| | Composition of catalyst | Compositional ratio (molar ratio) | Temp. at 10% combustion |
|---|---|---|---|
| Example 29 | $CuMoO_4$ + Cesium sulfate | 1:1 | 366° C. |
| Example 30 | $Cu_3Mo_2O_9$ + Cesium sulfate | 1:1 | 370° C. |
| Example 31 | $Cu_2MoO_5$ + Cesium sulfate | 1:1 | 368° C. |

TABLE 9

| | Composition of catalyst | Compositional ratio (molar ratio) | Temp. at 10% combustion |
|---|---|---|---|
| Example 32 | $Cu_5V_2O_{10}$ + Cesium sulfate | 10:1 | 422° C. |
| Example 33 | $Cu_5V_2O_{10}$ + Cesium sulfate | 9:1 | 399° C. |
| Example 34 | $Cu_5V_2O_{10}$ + Cesium sulfate | 5:1 | 392° C. |
| Example 35 | $Cu_5V_2O_{10}$ + Cesium sulfate | 2:1 | 378° C. |
| Example 36 | $Cu_5V_2O_{10}$ + Cesium sulfate | 1:2 | 366° C. |
| Example 37 | $Cu_5V_2O_{10}$ + Cesium sulfate | 1:5 | 372° C. |
| Example 38 | $Cu_5V_2O_{10}$ + Cesium sulfate | 1:9 | 386° C. |
| Example 39 | $Cu_5V_2O_{10}$ + Cesium sulfate | 1:10 | 420° C. |

TABLE 10

| | Composition of catalyst | Compositional ratio (molar ratio) | Temp. at 10% combustion |
|---|---|---|---|
| Example 40 | $Cu_5V_2O_{10}$ + Cesium sulfate + Pt | 1000:2000:1 | 419° C. |
| Example 41 | $Cu_5V_2O_{10}$ + Cesium sulfate + Pt | 100:200:1 | 365° C. |
| Example 42 | $Cu_5V_2O_{10}$ + Cesium sulfate + Pt | 30:60:1 | 355° C. |
| Example 43 | $Cu_5V_2O_{10}$ + Cesium sulfate + Pt | 15:30:1 | 350° C. |
| Example 44 | $Cu_5V_2O_{10}$ + Cesium sulfate + Pt | 10:20:1 | 352° C. |
| Example 45 | $Cu_5V_2O_{10}$ + Cesium sulfate + Pt | 3:6:1 | 360° C. |
| Example 46 | $Cu_5V_2O_{10}$ + Cesium sulfate + Pt | 1:2:1 | 382° C. |
| Example 47 | $Cu_5V_2O_{10}$ + Cesium sulfate + Pt | 1:2:2 | 421° C. |

TABLE 11

| | Composition of catalyst | Temp. at 10% combustion |
|---|---|---|
| Experiment 5 | $Cu_5V_2O_{10}$ | 397° C. |
| Example 105 | $Cu_{4.95}V_2Li_{0.05}O_{10-\alpha}$ | 382° C. |
| Example 106 | $Cu_{4.95}V_2Na_{0.05}O_{10-\alpha}$ | 382° C. |
| Example 107 | $Cu_{4.95}V_2K_{0.05}O_{10-\alpha}$ | 381° C. |
| Example 108 | $Cu_{4.95}V_2Rb_{0.05}O_{10-\alpha}$ | 381° C. |
| Example 109 | $Cu_{4.95}V_2Cs_{0.05}O_{10-\alpha}$ | 384° C. |
| Example 110 | $Cu_{4.95}V_2Be_{0.05}O_{10-\alpha}$ | 385° C. |
| Example 111 | $Cu_{4.95}V_2Mg_{0.05}O_{10-\alpha}$ | 382° C. |
| Example 112 | $Cu_{4.95}V_2Ca_{0.05}O_{10-\alpha}$ | 382° C. |
| Example 113 | $Cu_{4.95}V_2Sr_{0.05}O_{10-\alpha}$ | 381° C. |
| Example 114 | $Cu_{4.95}V_2Ba_{0.05}O_{10-\alpha}$ | 382° C. |
| Example 115 | $Cu_{4.95}V_2Sc_{0.05}O_{10-\alpha}$ | 381° C. |
| Example 116 | $Cu_{4.95}V_2Ti_{0.05}O_{10-\alpha}$ | 381° C. |
| Example 117 | $Cu_{4.95}V_2Cr_{0.05}O_{10-\alpha}$ | 380° C. |
| Example 118 | $Cu_{4.95}V_2Mn_{0.05}O_{10-\alpha}$ | 382° C. |
| Example 119 | $Cu_{4.95}V_2Fe_{0.05}O_{10-\alpha}$ | 384° C. |
| Example 120 | $Cu_{4.95}V_2Co_{0.05}O_{10-\alpha}$ | 383° C. |
| Example 121 | $Cu_{4.95}V_2Ni_{0.05}O_{10-\alpha}$ | 382° C. |
| Example 122 | $Cu_{4.95}V_2Zn_{0.05}O_{10-\alpha}$ | 383° C. |
| Example 123 | $Cu_{4.95}V_2Ga_{0.05}O_{10-\alpha}$ | 382° C. |
| Example 124 | $Cu_{4.95}V_2Ge_{0.05}O_{10-\alpha}$ | 381° C. |
| Example 125 | $Cu_{4.95}V_2Zr_{0.05}O_{10-\alpha}$ | 382° C. |
| Example 126 | $Cu_{4.95}V_2Nb_{0.05}O_{10-\alpha}$ | 382° C. |

TABLE 11-continued

|  | Composition of catalyst | Temp. at 10% combustion |
|---|---|---|
| Example 127 | $Cu_{4.95}V_2Mo_{0.05}O_{10-\alpha}$ | 382° C. |
| Example 128 | $Cu_{4.95}V_2Ta_{0.05}O_{10-\alpha}$ | 381° C. |
| Example 129 | $Cu_{4.95}V_2W_{0.05}O_{10-\alpha}$ | 384° C. |

TABLE 12

|  | Composition of catalyst | Temp. at 10% combustion |
|---|---|---|
| Experiment 5 | $Cu_5V_2O_{10}$ | 397° C. |
| Example 130 | $Cu_5V_{1.98}Li_{0.02}O_{10-\alpha}$ | 380° C. |
| Example 131 | $Cu_5V_{1.98}Na_{0.02}O_{10-\alpha}$ | 382° C. |
| Example 132 | $Cu_5V_{1.98}K_{0.02}O_{10-\alpha}$ | 388° C. |
| Example 133 | $Cu_5V_{1.98}Rb_{0.02}O_{10-\alpha}$ | 385° C. |
| Example 134 | $Cu_5V_{1.98}Cs_{0.02}O_{10-\alpha}$ | 384° C. |
| Example 135 | $Cu_5V_{1.98}Be_{0.02}O_{10-\alpha}$ | 384° C. |
| Example 136 | $Cu_5V_{1.98}Mg_{0.02}O_{10-\alpha}$ | 382° C. |
| Example 137 | $Cu_5V_{1.98}Ca_{0.02}O_{10-\alpha}$ | 382° C. |
| Example 138 | $Cu_5V_{1.98}Sr_{0.02}O_{10-\alpha}$ | 381° C. |
| Example 139 | $Cu_5V_{1.98}Ba_{0.02}O_{10-\alpha}$ | 382° C. |
| Example 140 | $Cu_5V_{1.98}Sc_{0.02}O_{10-\alpha}$ | 384° C. |
| Example 141 | $Cu_5V_{1.98}Ti_{0.02}O_{10-\alpha}$ | 383° C. |
| Example 142 | $Cu_5V_{1.98}Cr_{0.02}O_{10-\alpha}$ | 381° C. |
| Example 143 | $Cu_5V_{1.98}Mn_{0.02}O_{10-\alpha}$ | 382° C. |
| Example 144 | $Cu_5V_{1.98}Fe_{0.02}O_{10-\alpha}$ | 382° C. |
| Example 145 | $Cu_5V_{1.98}Co_{0.02}O_{10-\alpha}$ | 382° C. |
| Example 146 | $Cu_5V_{1.98}Ni_{0.02}O_{10-\alpha}$ | 381° C. |
| Example 147 | $Cu_5V_{1.98}Zn_{0.02}O_{10-\alpha}$ | 381° C. |
| Example 148 | $Cu_5V_{1.98}Ga_{0.02}O_{10-\alpha}$ | 382° C. |
| Example 149 | $Cu_5V_{1.98}Ge_{0.02}O_{10-\alpha}$ | 385° C. |
| Example 150 | $Cu_5V_{1.98}Zr_{0.02}O_{10-\alpha}$ | 382° C. |
| Example 151 | $Cu_5V_{1.98}Nb_{0.02}O_{10-\alpha}$ | 382° C. |
| Example 152 | $Cu_5V_{1.98}Mo_{0.02}O_{10-\alpha}$ | 381° C. |
| Example 153 | $Cu_5V_{1.98}Ta_{0.02}O_{10-\alpha}$ | 382° C. |
| Example 154 | $Cu_5V_{1.98}W_{0.02}O_{10-\alpha}$ | 382° C. |

TABLE 13

|  | Composition of catalyst | Temp. at 10% combustion |
|---|---|---|
| Experiment 10 | $CuMoO_4$ | 416° C. |
| Example 155 | $CuMo_{0.99}Li_{0.01}O_{4-\alpha}$ | 400° C. |
| Example 156 | $CuMo_{0.99}Na_{0.01}O_{4-\alpha}$ | 400° C. |
| Example 157 | $CuMo_{0.99}K_{0.01}O_{4-\alpha}$ | 402° C. |
| Example 158 | $CuMo_{0.99}Rb_{0.01}O_{4-\alpha}$ | 401° C. |
| Example 159 | $CuMo_{0.99}Cs_{0.01}O_{4-\alpha}$ | 402° C. |
| Example 160 | $CuMo_{0.99}Be_{0.01}O_{4-\alpha}$ | 400° C. |
| Example 161 | $CuMo_{0.99}Mg_{0.01}O_{4-\alpha}$ | 400° C. |
| Example 162 | $CuMo_{0.99}Ca_{0.01}O_{4-\alpha}$ | 400° C. |
| Example 163 | $CuMo_{0.99}Sr_{0.01}O_{4-\alpha}$ | 400° C. |
| Example 164 | $CuMo_{0.99}Ba_{0.01}O_{4-\alpha}$ | 401° C. |
| Example 165 | $CuMo_{0.99}Sc_{0.01}O_{4-\alpha}$ | 401° C. |
| Example 166 | $CuMo_{0.99}Ti_{0.01}O_{4-\alpha}$ | 402° C. |
| Example 167 | $CuMo_{0.99}V_{0.01}O_{4-\alpha}$ | 402° C. |
| Example 168 | $CuMo_{0.99}Cr_{0.01}O_{4-\alpha}$ | 398° C. |
| Example 169 | $CuMo_{0.99}Mn_{0.01}O_{4-\alpha}$ | 399° C. |
| Example 170 | $CuMo_{0.99}Fe_{0.01}O_{4-\alpha}$ | 400° C. |
| Example 171 | $CuMo_{0.99}Co_{0.01}O_{4-\alpha}$ | 399° C. |
| Example 172 | $CuMo_{0.99}Ni_{0.01}O_{4-\alpha}$ | 402° C. |
| Example 173 | $CuMo_{0.99}Cu_{0.01}O_{4-\alpha}$ | 402° C. |
| Example 174 | $CuMo_{0.99}Zn_{0.01}O_{4-\alpha}$ | 402° C. |
| Example 175 | $CuMo_{0.99}Ga_{0.01}O_{4-\alpha}$ | 400° C. |
| Example 176 | $CuMo_{0.99}Ge_{0.01}O_{4-\alpha}$ | 401° C. |
| Example 177 | $CuMo_{0.99}Zr_{0.01}O_{4-\alpha}$ | 402° C. |
| Example 178 | $CuMo_{0.99}Nb_{0.01}O_{4-\alpha}$ | 402° C. |

TABLE 13-continued

|  | Composition of catalyst | Temp. at 10% combustion |
|---|---|---|
| Example 179 | $CuMo_{0.99}Ta_{0.01}O_{4-\alpha}$ | 401° C. |
| Example 180 | $CuMo_{0.99}W_{0.01}O_{4-\alpha}$ | 400° C. |

TABLE 14

|  | Composition of catalyst | Temp. at 10% combustion |
|---|---|---|
| Experiment 5 | $Cu_5V_2O_{10}$ | 397° C. |
| Example 181 | $Cu_{4.9995}V_2Li_{0.0005}O_{10-\alpha}$ | 395° C. |
| Example 182 | $Cu_{4.995}V_2Li_{0.005}O_{10-\alpha}$ | 388° C. |
| Example 105 | $Cu_{4.95}V_2Li_{0.05}O_{10-\alpha}$ | 382° C. |
| Example 183 | $Cu_{3.5}V_2Li_{1.5}O_{10-\alpha}$ | 387° C. |
| Example 184 | $Cu_{2.5}V_2Li_{2.5}O_{10-\alpha}$ | 393° C. |
| Example 185 | $Cu_2V_2Li_3O_{10-\alpha}$ | 404° C. |

TABLE 15

|  | Composition of catalyst | Temp. at 10% combustion |
|---|---|---|
| Experiment 5 | $Cu_5V_2O_{10}$ | 397° C. |
| Example 186 | $Cu_5V_{1.9998}Li_{0.0002}O_{10-\alpha}$ | 396° C. |
| Example 187 | $Cu_5V_{1.998}Li_{0.002}O_{10-\alpha}$ | 387° C. |
| Example 130 | $Cu_5V_{1.98}Li_{0.02}O_{10-\alpha}$ | 380° C. |
| Example 188 | $Cu_5V_{1.4}Li_{0.6}O_{10-\alpha}$ | 386° C. |
| Example 189 | $Cu_5V_1Li_1O_{10-\alpha}$ | 394° C. |
| Example 190 | $Cu_5V_{0.8}Li_{1.2}O_{10-\alpha}$ | 398° C. |

TABLE 16

|  | Composition of catalyst | Temp. at 10% combustion |
|---|---|---|
| Experiment 10 | $CuMoO_4$ | 416° C. |
| Example 191 | $CuMo_{0.9999}Li_{0.0001}O_{4-\alpha}$ | 415° C. |
| Example 192 | $CuMo_{0.999}Li_{0.001}O_{4-\alpha}$ | 401° C. |
| Example 155 | $CuMo_{0.99}Li_{0.01}O_{4-\alpha}$ | 400° C. |
| Example 193 | $CuMo_{0.7}Li_{0.3}O_{4-\alpha}$ | 402° C. |
| Example 194 | $CuMo_{0.5}Li_{0.5}O_{4-\alpha}$ | 413° C. |
| Example 195 | $CuMo_{0.4}Li_{0.6}O_{4-\alpha}$ | 420° C. |

TABLE 17

|  | Composition of catalyst | (Compositional molar ratio) | Temp. at 10% combustion |
|---|---|---|---|
| Example 1 | Cs sulfate + Cu oxide | 1:1 | 398° C. |
| Example 196 | Cs sulfate + Li sulfate + Cu oxide | 65:35:100 | 377° C. |
| Example 197 | Cs sulfate + Na sulfate + Cu oxide | 65:35:100 | 374° C. |
| Example 198 | Cs sulfate + K sulfate + Cu oxide | 65:35:100 | 364° C. |
| Example 199 | Cs sulfate + Rb sulfate + Cu oxide | 65:35:100 | 372° C. |
| Example 200 | Cs sulfate + Be sulfate + Cu oxide | 65:35:100 | 377° C. |
| Example 201 | Cs sulfate + Mg sulfate + Cu oxide | 65:35:100 | 379° C. |
| Example 202 | Cs sulfate + Ca sulfate + Cu oxide | 65:35:100 | 375° C. |

TABLE 17-continued

|  | Composition of catalyst | (Compositional molar ratio) | Temp. at 10% combustion |
|---|---|---|---|
| Example 203 | Cs sulfate + Sr sulfate + Cu oxide | 65:35:100 | 374° C. |
| Example 204 | Cs sulfate + Ba sulfate + Cu oxide | 65:35:100 | 372° C. |

TABLE 18

|  | Composition of catalyst | (Compositional molar ratio) | Temp. at 10% combustion |
|---|---|---|---|
| Example 1 | Cs sulfate + Cu oxide | 1:1 | 398° C. |
| Example 205 | Cs sulfate + K sulfate + Cu oxide | 90:10:100 | 387° C. |
| Example 206 | Cs sulfate + K sulfate + Cu oxide | 80:20:100 | 368° C. |
| Example 198 | Cs sulfate + K sulfate + Cu oxide | 65:35:100 | 364° C. |
| Example 207 | Cs sulfate + K sulfate + Cu oxide | 40:60:100 | 367° C. |
| Example 208 | Cs sulfate + K sulfate + Cu oxide | 30:70:100 | 396° C. |
| Example 4 | K sulfate + Cu oxide | 1:1 | 407° C. |

What is claimed is:

1. A catalyst for exhaust gas purification comprising a complex metal oxide of Cu and V or a complex metal oxide of Cu and Mo, and at least one alkali metal sulfate selected from the group consisting of sulfates of Li, Na, Rb and Cs.

2. A catalyst for exhaust gas purification according to claim 1, wherein a molar ratio of the complex metal oxide to the sulfate is 9:1 to 1:9.

3. A catalyst for exhaust gas purification comprising a complex metal oxide of Cu and V or a complex metal oxide of Cu and Mo, at least one alkali metal sulfate selected from the group consisting of sulfates of Li, Na, Rb and Cs, and at least one noble metal selected from the group consisting of Pt, Pd and Rh.

4. A catalyst for exhaust gas purification according to claim 1, wherein a molar ratio of the complex metal oxide to the noble metal is 100:1 to 3:1.

5. A catalyst for exhaust gas purification comprising a complex metal oxide of Cu and V or a complex metal oxide of Cu and Mo, and at least one alkali metal sulfate selected from the group consisting of sulfates of Li, Na, Rb and Cs, wherein a part of Cu, V or Mo contained in the catalyst is replaced by at least one substituent metal selected from the group consisting of Li, Na, K, Rb, Cs, Be, Mg, Ca, Sr, Ba, Sc, Ti, Cr, Mn, Fe, Co, Ni, Zn, Ga, Ge, Zr, Nb, Mo, Ta and W.

6. A catalyst for exhaust gas purification according to claim 5, wherein the substituent metal is present in an amount of from 0.01% to 50%.

7. A catalyst for exhaust gas purification according to claim 1, wherein the sulfates comprise cesium sulfate and at least one alkali metal sulfate selected from the group consisting of sulfates of Li, Na, K and Rb and/or at least one alkaline earth metal sulfate selected from the group consisting of sulfates of Be, Mg, Ca, Sr and Ba.

8. A catalyst for exhaust gas purification according to claim 7, wherein the sulfates comprise cesium sulfate and potassium sulfate.

9. A catalyst for exhaust gas purification according to claim 8, wherein a molar mixing ratio of cesium sulfate to potassium sulfate is 9:1 to 3:7.

10. A catalyst for exhaust gas purification according to claim 1, wherein the alkali metal sulfate is cesium sulfate.

11. A process for producing a catalyst for exhaust gas purification according to claim 1 which comprises:
a mixing step in which said complex metal oxide is mixed with an aqueous sulfate solution;
a drying step in which a mixed solution obtained by the mixing step is evaporated to dryness;
and a heat-treatment step in which a mixed powder obtained by the drying step is heat-treated.

12. A catalyst for exhaust gas purification comprising a complex metal oxide of Cu and V or a complex metal oxide of Cu and Mo, and at least two alkali metal sulfates selected from the group consisting of sulfates of Li, Na, K, Rb and Cs.

13. A catalyst for exhaust gas purification according to claim 12, wherein one of the alkali metal sulfates is cesium sulfate.

14. A catalyst for exhaust gas purification comprising a complex metal oxide selected from the group consisting of $CuVO_3$, $Cu_3V_2O_8$, $Cu_5V_2O_{10}$, $CuMoO_4$, $Cu_3Mo_2O_9$ and $Cu_2MoO_5$, and at least one alkali metal sulfate selected from the group consisting of sulfates of Li, Na, K, Rb and Cs.

15. A catalyst for exhaust gas purification comprising a complex metal oxide of Cu and V or a complex metal oxide of Cu and Mo, and at least one alkaline earth metal sulfate selected from the group consisting of sulfates of Be, Mg, Sr and Ba.

16. A catalyst for exhaust gas purification comprising a complex metal oxide selected from the group consisting of $CuVO_3$, $Cu_3V_2O_8$, $Cu_5V_2O_{10}$, $CuMoO_4$, $Cu_3Mo_2O_9$ and $Cu_2MoO_5$, and at least one alkaline earth metal sulfate selected from the group consisting of sulfates of Be, Mg, Ca, Sr and Ba.

17. A catalyst for exhaust gas purification comprising a complex metal oxide of Cu and V or a complex metal oxide of Cu and Mo, at least one alkali metal sulfate selected from the group consisting of sulfates of Li, Na, K, Rb and Cs, and at least one alkaline earth metal sulfate selected from the group consisting of sulfates of Be, Mg, Ca, Sr and Ba.

18. A catalyst for exhaust gas purification according to claim 17, wherein a molar ratio of the complex metal oxide to the sulfate is 9:1 to 1:9.

19. A catalyst for exhaust gas purification according to claim 18, which further comprises at least one noble metal selected from the group consisting of Pt, Pd and Rh.

20. A catalyst for exhaust gas purification according to claim 19, wherein a molar ratio of the complex metal oxide to the noble metal is 100:1 to 3:1.

21. A catalyst for exhaust gas purification according to claim 17, wherein a part of Cu, V or Mo contained in the catalyst for exhaust gas purification is replaced by at least one substituent metal selected from the group consisting of Li, Na, K, Rb, Cs, Be, Mg, Ca, Sr, Ba, Sc, Ti, Cr, Mn, Fe, Co, Ni, Zn, Ga, Ge, Zr, Nb, Mo, Ta and W.

22. A catalyst for exhaust gas purification according to claim 21, wherein the substituent metal is present in an amount of from 0.01% to 50%.

23. A catalyst for exhaust gas purification according to claim 17, wherein the sulfates comprise cesium sulfate and at least one alkali metal sulfate selected from the group consisting of sulfates of Li, Na, K and Rb and/or at least one alkaline earth metal sulfate selected from the group consisting of sulfates of Be, Mg, Ca, Sr and Ba.

24. A catalyst for exhaust gas purification according to claim 23, wherein the sulfates comprise cesium sulfate and potassium sulfate.

25. A catalyst for exhaust gas purification according to claim 24, wherein a molar mixing ratio of cesium sulfate to potassium sulfate is 9:1 to 3:7.

26. A catalyst according to claim 17, wherein the complex metal oxide is selected from the group consisting of $CuVO_3$, $Cu_3V_2O_8$, $Cu_5V_2O_{10}$, $CuMoO_4$, $Cu_3Mo_2O_9$, and $Cu_2MoO_5$.

27. A process for producing a catalyst for exhaust gas purification according to claim 17 which comprises:

a mixing step in which said complex metal oxide is mixed with an aqueous sulfate solution;

a drying step in which a mixed solution obtained by the mixing step evaporated to dryness; and a heat-treatment step in which a mixed powder obtained by the drying step is heat-treated.

* * * * *